(12) United States Patent
Wu et al.

(10) Patent No.: US 8,488,299 B2
(45) Date of Patent: Jul. 16, 2013

(54) CAPACITOR STRUCTURE

(75) Inventors: Shih-Hsien Wu, Taoyuan County (TW);
Min-Lin Lee, Hsinchu (TW);
Shinn-Juh Lai, Hsinchu County (TW);
Shur-Fen Liu, Hsinchu County (TW);
Meng-Hua Chen, Kaohsiung County (TW); Chin-Hsien Hung, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 308 days.

(21) Appl. No.: 12/841,456

(22) Filed: Jul. 22, 2010

(65) Prior Publication Data

US 2011/0019335 A1    Jan. 27, 2011

(30) Foreign Application Priority Data

Jul. 23, 2009   (TW) ................................ 98124852 A

(51) Int. Cl.
*H01G 4/005*      (2006.01)
*H01G 5/06*       (2006.01)

(52) U.S. Cl.
USPC ............................ 361/330; 361/303; 361/311

(58) Field of Classification Search
USPC ................................................ 361/328–300
See application file for complete search history.

(56) References Cited

U.S. PATENT DOCUMENTS

| 3,962,713 | A | 6/1976 | Kendall et al. | |
| 6,274,224 | B1 * | 8/2001 | O'Bryan et al. | 428/209 |
| 7,339,798 | B2 * | 3/2008 | Chakravorty | 361/782 |
| 8,085,522 | B2 * | 12/2011 | Sasaki et al. | 361/303 |
| 2007/0040204 | A1 | 2/2007 | Pulugurtha et al. | |
| 2008/0266750 | A1 * | 10/2008 | Wu et al. | 361/313 |

FOREIGN PATENT DOCUMENTS

| CN | 1403853 A | 3/2003 |
| CN | 101527199 A | 9/2009 |
| TW | 200924156 A | 6/2009 |

* cited by examiner

*Primary Examiner* — Eric Thomas
(74) *Attorney, Agent, or Firm* — Morris Manning & Martin LLP; Tim Tingkang Xia, Esq.

(57) ABSTRACT

The disclosure provides a capacitor structure. A first dielectric layer is disposed over the first electrode layer. A second electrode layer is disposed over the first dielectric layer. At least one of the first electrode layer and the second electrode layer has a peak-valley like structure to create at least two different gap distances therebetween, thereby providing parallel combinations of at least two different capacitances.

13 Claims, 28 Drawing Sheets

CAPACITOR STRUCTURE

CROSS REFERENCE TO RELATED APPLICATIONS

This Application claims priority of Taiwan Patent Application No. 098124852, filed on Jul. 23, 2009, the entirety of which is incorporated by reference herein.

BACKGROUND

1. Technical Field

The present disclosure relates to a capacitor structure and more particularly relates to a composite capacitor structure having a peak-valley like structure.

2. Description of the Related Art

More and more electronic devices are being required to be microminiaturized (light, thin, and small) with high efficiency. Thus, capacitor devices in electronic devices are being required to be small, have a large capacitance and have low impedance at high frequency bands. In practice, an embedded large capacitance capacitor device having low impedance at high frequency bands may be used to decrease noises from a power supply at the high frequency bands due to circuit switching at high speeds.

The capacitance (C) of the capacitor device may be expressed by the following equation:

$$C = K \frac{A}{d},$$

wherein K is a dielectric constant (k value) of a dielectric layer, d is a gap distance between conductive materials, and A is an overlapped area between the conductive materials. Thus, to increase the capacitance of the capacitor device, the dielectric constant (K) of the dielectric layer or the overlapped area between the conductive materials needs to be increased, or the gap distance (d) between the conductive materials need to be decreased. However, due to material, process, and fabrication limitations, it is difficult to feasibly increase the dielectric constant (K) of the dielectric layer. Due to process and fabrication limitations, it is difficult to feasibly decrease the gap distance (d) between the conductive materials. Additionally, the overlapped area (A) between the conductive materials in conventional flat-type capacitor structures is not allowed of increasing significantly due to of flat substrate surface limitations. Thus, the capacitor device lacks sparking development in capacitance.

In the conventional technology, the embedded capacitor of the package or on the substrate may not achieve the effect of low impedance at high frequency. Therefore, the on-chip capacitor is usually utilized to inhibit noise at high frequency bands (GHz). However, the on-chip capacitor takes up a lot of chip space and some chip circuit designs do not allow enough space for on-chip capacitors. Meanwhile, to inhibit noise at middle to low frequency bands, a surface mount device (SMD) capacitor is utilized, since the embedded capacitor of the package or on the substrate also can not achieve large capacitance. Thus, a capacitor inhibiting noise in all frequency bands, having a large capacitance and low impedance is desired.

BRIEF SUMMARY

The disclosure provides a capacitor structure. A first dielectric layer is disposed over a first electrode layer. A second electrode layer is disposed over the first dielectric layer. At least one of the first electrode layer and the second electrode layer has a peak-valley like structure to create at least two different gap distances therebetween, thereby providing parallel combinations of at least two different capacitances.

The disclosure also provides a capacitor structure. A first dielectric layer is disposed over a first electrode layer. A second electrode layer is disposed over the first dielectric layer. A first via passing through the first dielectric layer is connected with the first electrode layer or the second electrode layer. At least one of the first electrode layer and the second electrode layer has a peak-valley like structure to create at least two different gap distances therebetween, thereby providing parallel combinations of at least two different capacitances. The first electrode layer or the second electrode layer is connected to a ground or power with the first via.

BRIEF DESCRIPTION OF DRAWINGS

The present disclosure can be more fully understood by reading the subsequent detailed description and examples with references made to the accompanying drawings, wherein.

DETAILED DESCRIPTION

Figure 1A:
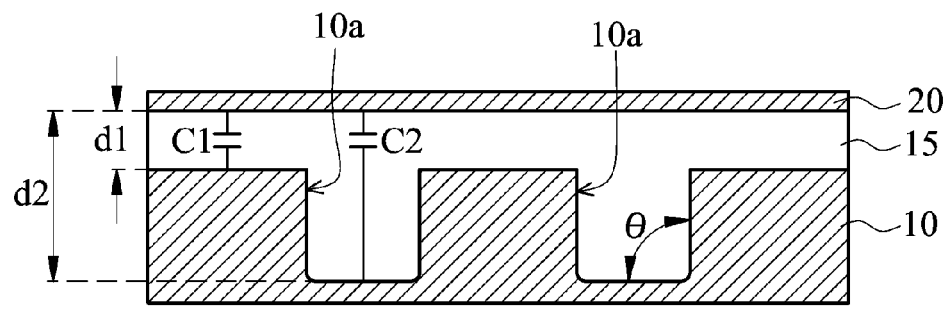
FIGS. 1a-1c are cross-section views of the capacitor structure according to the first exemplary embodiment of the present disclosure.

A detailed description is given in the following embodiments with reference to the accompanying drawings.

Embodiments of the present disclosure provide a composite capacitor structure having a peak-valley like structure to provide parallel combinations of different capacitances. Thus, multiple resonant frequency points may be provided to increase the impedance bandwidth, and the wideband noises of the decoupling capacitor of the electronic circuit may be inhibited. The composite capacitor structure of the present disclosure may eliminates high, middle and low frequency band noise and also provides large capacitance by using a peak-valley like structure to increase the effective surface area.

References will be made in detail to the present embodiments, examples of which are illustrated in the accompanying drawings. Wherever possible, the same reference numbers are used in the drawings and the descriptions to refer to the same or like parts. In the drawings, the shape and thickness of one embodiment may be exaggerated for clarity and convenience. The descriptions will be directed in particular to elements forming a part of, or cooperating more directly with, devices in accordance with the present disclosure. It is to be understood that elements not specifically shown or described may take various forms well known to those skilled in the art. Further, when a layer is referred to as being on another layer or "on" a substrate, it may be directly on the other layer or on the substrate, or intervening layers may also be present.

FIG. 1a is a cross-section view of the capacitor structure of a first embodiment of the present disclosure. The capacitor structure comprises a first electrode layer 10, a first dielectric layer 15 disposed on the first electrode layer 10, and a second electrode layer 20 disposed on the first dielectric layer 15. As shown in FIG. 1a, in this embodiment, the first electrode layer 10 has a peak-valley like structure, and the second electrode layer 20 is a flat electrode. Therefore, there are two different vertical gap distances d1 and d2 between the first electrode layer 10 and the second electrode layer 20.

The capacitance (C) of the device is determined with the following equation (K is the dielectric constant of the dielectric layer, d is the gap distance between the electrodes, and A is the overlapped area between the electrodes):

$$C = K\frac{A}{d}.$$

Therefore, the capacitor structure has parallel combinations of at least two base capacitances C1 and C2 and achieves wide bandwidth and low impedance effect to inhibit noise of different frequency bands. In addition, compared with the flat electrode, the peak-valley like structure of the present disclosure has a greater overlapped area between the electrodes, and thus has the increased capacitance. The peak-valley like structure allows the capacitor having large capacitance. The peak-valley like structure is also suitable for low-band applications, such as bulk capacitors.

The peak-valley like structure of the present disclosure may be varied to have, for example, concaves of different depths and/or convexes of different heights to create at least two ($\geqq 2$) different gap distances between the first electrode layer 10 and the second electrode layer 20.

Figure 1B:
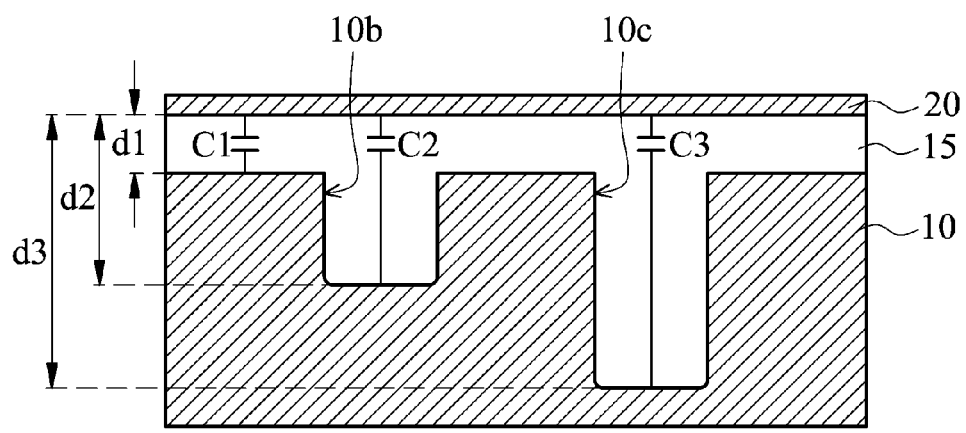

FIG. 1b illustrates a variation of the first embodiment of the present disclosure. The peak-valley like structure of the first electrode layer 10 has concaves 10b and 10c of two different depths to create three different vertical gap distances d1, d2 and d3 between the first electrode layer 10 and the second electrode layer 20. Therefore, the capacitor has parallel combinations of at least three base capacitances C1, C2 and C3. The capacitor structure allows construct of various base capacitances, improving the design flexibility when combining capacitors.

Figure 1C:
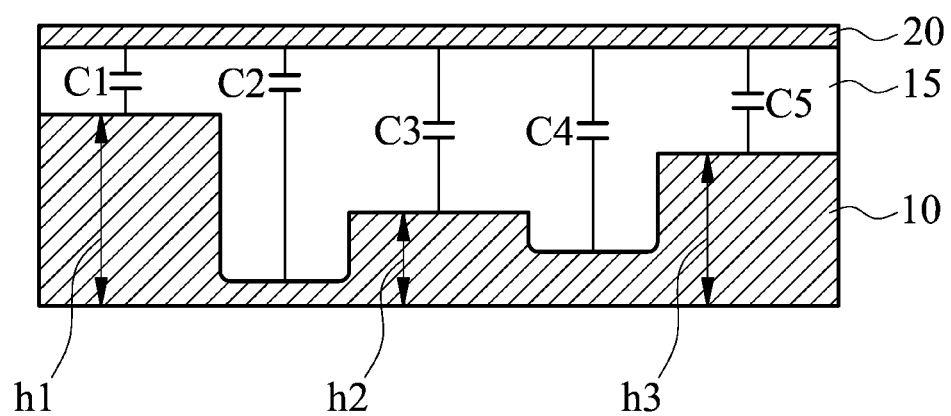
Figure 1D:
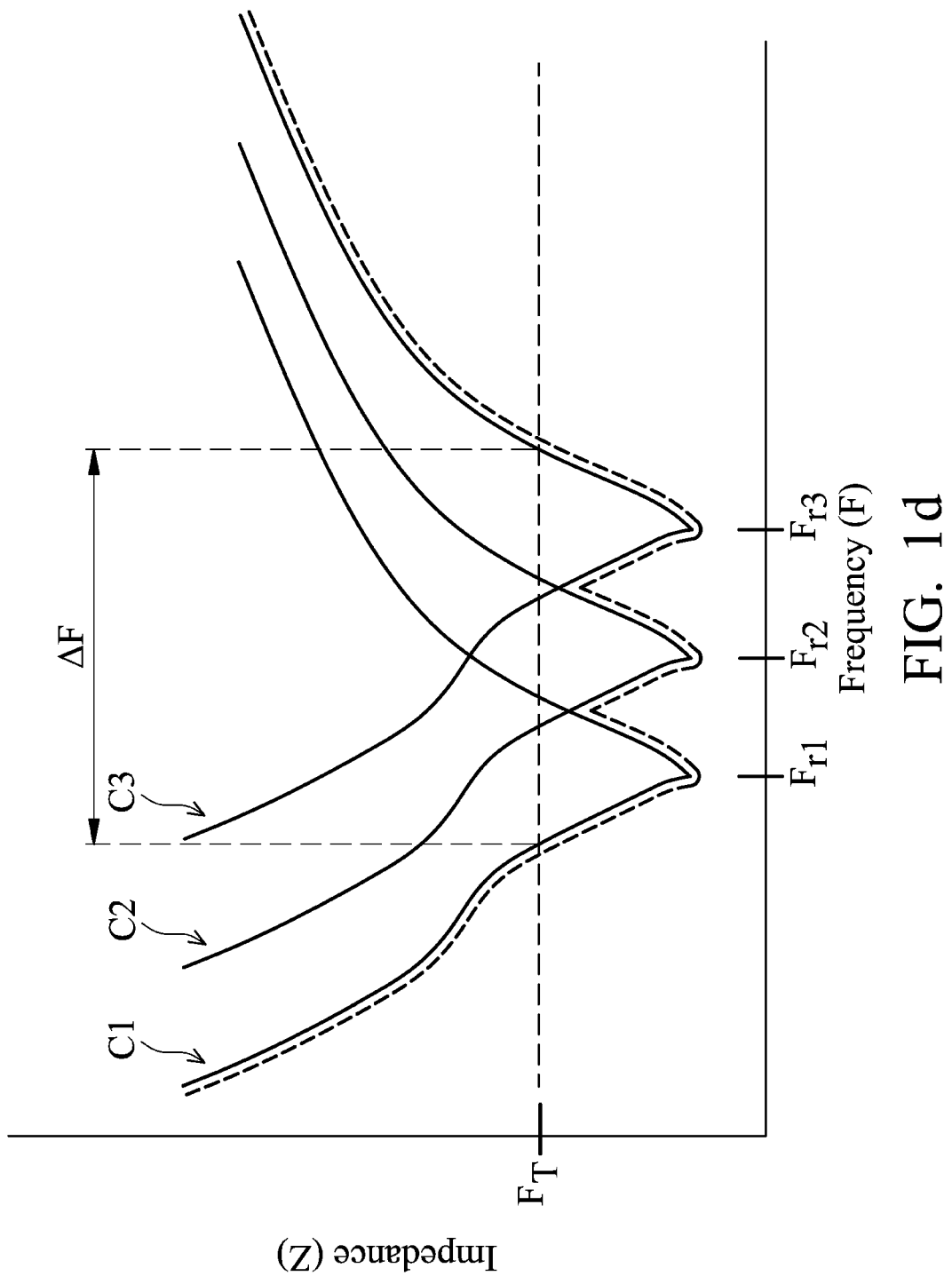
FIG. 1d depicts the impedance vs. frequency characteristics according to an exemplary embodiment of the present disclosure.

Note that when referring to FIG. 1d, it is understood that as a result of parallel combinations of three base capacitances C1, C2 and C3, the multiple-resonant-point wideband ($\Delta F$) capacitor of the disclosure has a low target impedance (ZT), and is suitable for inhibiting noise in all frequency bands for the decoupling capacitor of the electronic circuit.

FIG. 1c illustrates another variation of the first embodiment of the present disclosure. The peak-valley like structure of the first electrode layer 10 not only has the concaves of different depths but also the convexes of three different heights h1, h2 and h3. Thus the capacitor structure has parallel combinations of at least five base capacitances C1-C5.

Accordingly, in the peak-valley structure of the present disclosure, the depth of each of the concaves and the height of each of the convexes may independently be varied according to practical applications for fabricating the capacitor device having parallel combinations effect of various base capacitances for conforming various bandwidth. In addition, although the angle $\theta$ of the concave illustrated in FIGS. 1a-1c is about 90 degrees, in other embodiments, the angle $\theta$ may be larger or smaller than 90 degrees.

The following description illustrates the materials and fabrication methods for the capacitor structure. Referring to FIGS. 1a-1c, the first electrode layer 10 having the peak-valley structure is a conductive material, such as copper, gold, aluminum, palladium, nickel, silver, etc. The first electrode layer 10 may also be a conductive polymer, conductive ceramics, or combinations thereof. In an embodiment, the concaves may have a flat bottom as illustrated in FIGS. 1a-1c. Furthermore, the areas of the flat bottoms of each of the concaves may be different to regulate the capacitances of each of capacitors (e.g. C1-C5). In other words, besides the depth, the areas of the flat bottoms of each of the concaves may also sense as a parameter to determine the capacitances, which may be properly adjusted depending on design requirements.

The first electrode layer 10 is formed as a supporting bulk and has a peak-valley structure. In addition, the first electrode layer 10 is important in determining the effect serious inductance (ESL) of the capacitor structure. A low effect serious inductance may be obtained through appropriate designs. The concaves 10a, 10b, and 10c may be formed by a wet etching, dry etching or pressing method. The depth and width of each of the concaves may be properly adjusted according to the capacitance requirements. In one embodiment, the electrode layer 10 is a metal foil such as copper foil, and the concave 10a is preferably formed by a mold press method. Note that due to heat-resistant limitations of the organic substrate, the pressing temperature is usually between 140° C. and 200° C., far lower than the 500° C. high temperature processes utilized for a silicon substrates. Thus, the mold press process is suitable for the organic substrate of the present disclosure and can reduce manufacturing cost. It is noted that the present disclosure is not limited to the organic substrate. In fact, some embodiments of the present disclosure may use a silicon substrate or other semiconductor substrates.

The first dielectric layer 15 used as a capacitor dielectric layer is formed on the first electrode layer 10. The first dielectric layer 15 is usually an insulating dielectric material comprising an organic or inorganic material, such us an epoxy resin, fiber glass, polyimide, ABF (Ajinomoto build-up film), BT (Bismaleimide Triacine), silicon dioxide ($SiO_2$), aluminum oxide ($Al_2O_3$), silicon, glass or other suitable materials. In addition, the first dielectric layer 15 may also be a high-k dielectric material comprising an organic or inorganic material. The first dielectric layer 15 may be formed by coating, sputtering or other suitable methods. The first dielectric layer 15 is preferably formed by a pressing or inkjet printing method. Using the inkjet printing method may prevent deposition dead-space or deposition incompleteness, and may provide a thin conformal material layer (for example, about 0.1 μm to about 10 μm). The inkjet printing method is especially suitable for forming the conformal material layer on the oblique-angle concave.

The second electrode layer 20 is formed on the first dielectric layer 15. The material of the second electrode layer 20 may be the same with or different from the material of the first electrode layer 10. The second electrode layer 20 may be formed by coating, sputtering, electroplating, pressing, inject printing, or other suitable methods.

Moreover, the capacitor structure of FIG. 1a may be formed by a manufacturing process on a sheet of thick metal with appropriate processes. The finished structure may be used as a sheet of thick copper foil, which may be referred to as capacitive conductor pairs due to the embedded capacitor thereof, and is very helpful for the development of the decoupling capacitor application. In addition, although it is not illustrated in FIG. 1a, under the first electrode layer 10, there may be an organic substrate, inorganic substrate, prepreg, or a supporting board that may be removed later.

The following description further illustrates other embodiments of the present disclosure. For easy understanding, the same reference numbers are used to refer to the same or like parts. Unless being specifically described, the following electrode layer and the dielectric layer may be formed with the materials and methods described previously.

Figure 2A:
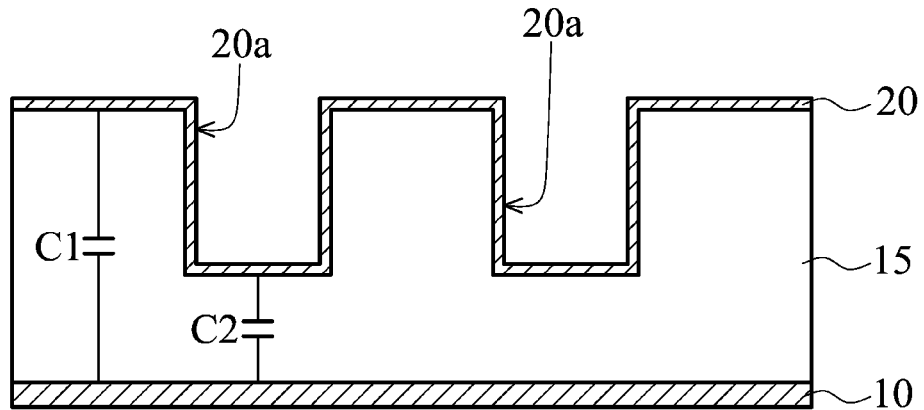
FIGS. 2a-2c are cross-section views of the capacitor structure according to the second exemplary embodiment of the present disclosure.

FIG. 2a is a cross-section view of the capacitor structure of a second embodiment of the present disclosure. The capacitor structure also comprises the first electrode layer 10, first dielectric layer 20, and second electrode layer 20. This embodiment is different from the first embodiment. The first electrode layer 10 is a flat electrode, and the second electrode layer is a peak-valley like structure. As shown in FIG. 2a, the peak-valley like structure has two different gap distances between the first electrode layer 10 and the second electrode layer 20. Therefore, the capacitor structure has parallel combinations of at least two base capacitances C1 and C2.

Figure 2B:
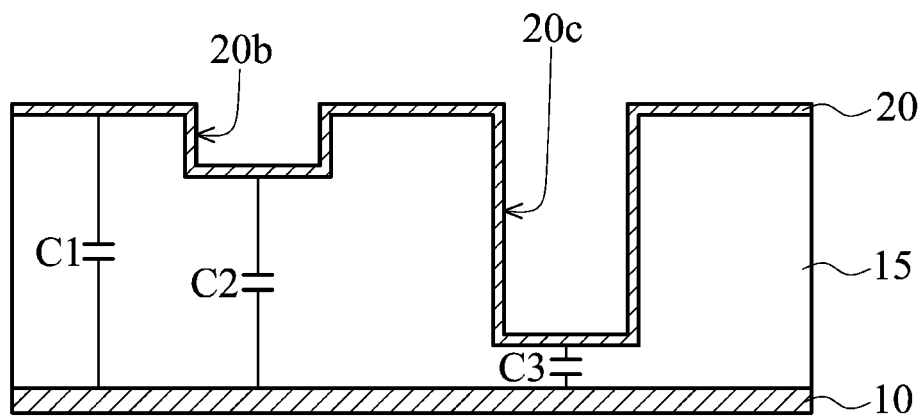

FIG. 2b illustrates a variation of the second embodiment. Compared to the concave 20a of FIG. 2a having the same depths, the concaves 20b and 20c in FIG. 2b have different depths. Therefore, there are three different vertical gap distances between the first electrode layer 10 and the second electrode layer 20, and parallel combinations of at least three different base capacitances C1, C2 and C3 are created.

Figure 2C:
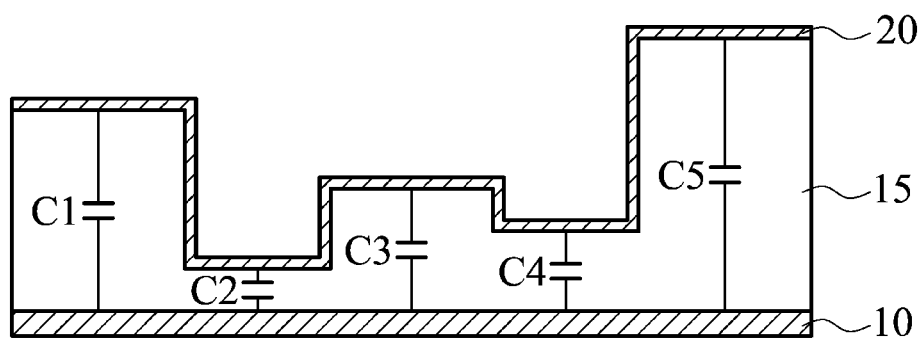

FIG. 2c illustrates another variation of the second embodiment. Compared to FIG. 2b, in addition to concaves of different depths, the peak-valley like structure of the second electrode 20 in FIG. 2c has convexes of three different heights. Thus, the capacitor structure has parallel combinations of at least five base capacitances C1-C5.

Therefore, each of the concave depths and convex heights of the peak-valley structure may be adjusted to create at least two (≧2) base capacitances to increase design flexibility in combining capacitors.

Figure 3A:
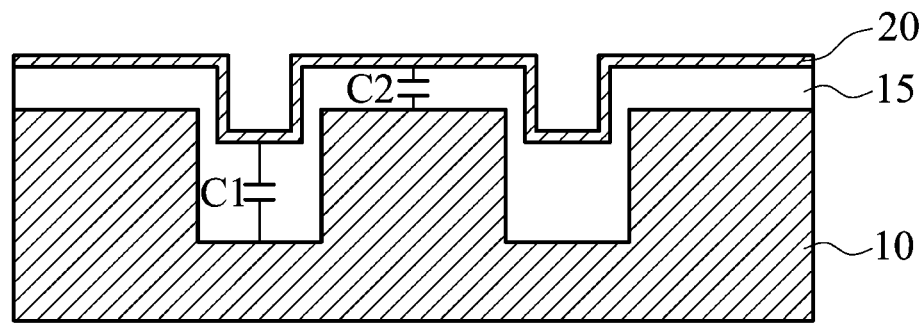
FIGS. 3a-3c are cross-section views of the capacitor structure according to the third exemplary embodiment of the present disclosure.

FIG. 3a is a cross-section view of the capacitor structure of a third embodiment of the present disclosure. As shown in FIG. 3a, in this embodiment, the first electrode layer 10 and second electrode layer 20 both have peak-valley like structures. The first electrode layer 10 and second electrode layer 20 only have two vertical gap distances, and thus the capacitor structure has parallel combinations of at least two base capacitances C1 and C2.

Figure 3B:
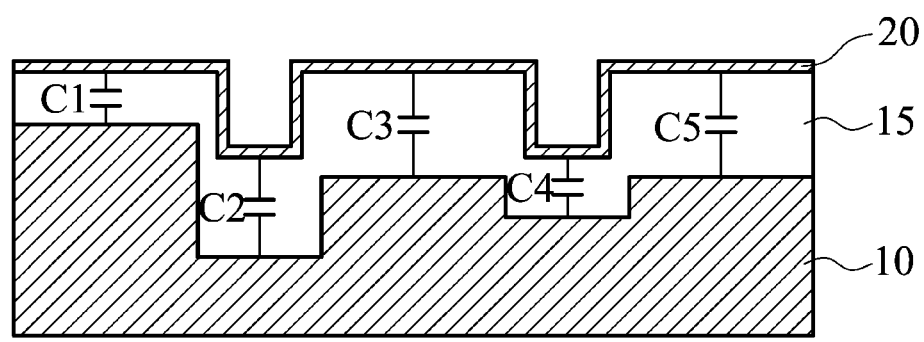
Figure 3C:
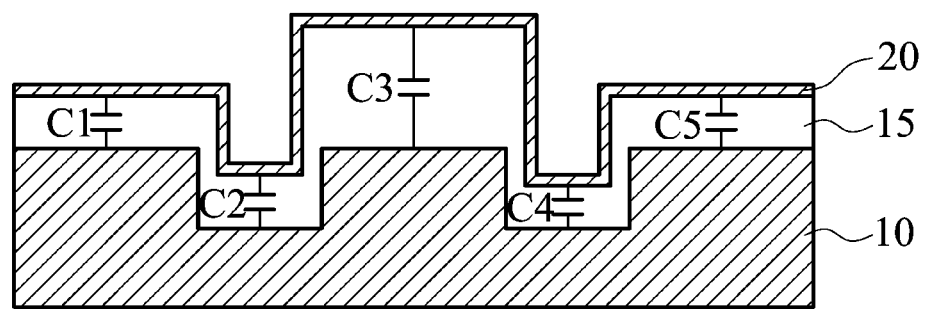

In a variation of the third embodiment shown in FIG. 3b, the peak-valley like structure of the first electrode layer 10 has various different depths and heights, and thus the capacitor structure has parallel combinations of at least five base capacitances C1-C5. In a variation of the third embodiment shown in FIG. 3c, the peak-valley like structure of the second electrode layer 20 has various different depths and heights, and thus the capacitor structure has parallel combinations of at least five base capacitances C1-C5. Although not illustrated in the figures, the peak-valley like structures of the two electrode layers 10, 20 may both have various different depths and heights.

Figure 4A:
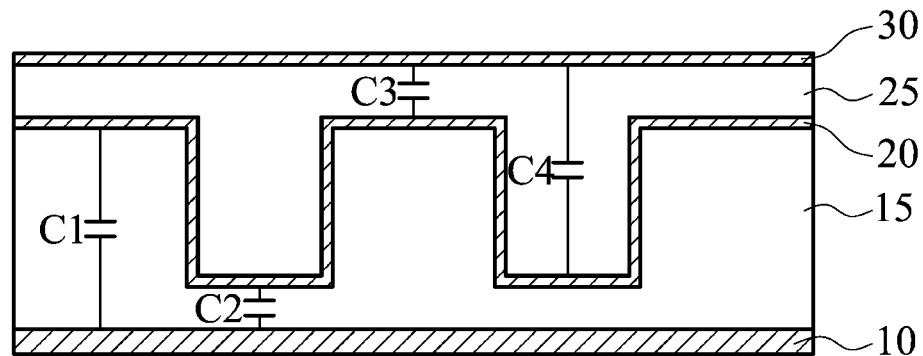
FIGS. 4a-4b are cross-section views of the capacitor structure according to the fourth exemplary embodiment of the present disclosure.
Figure 4B:
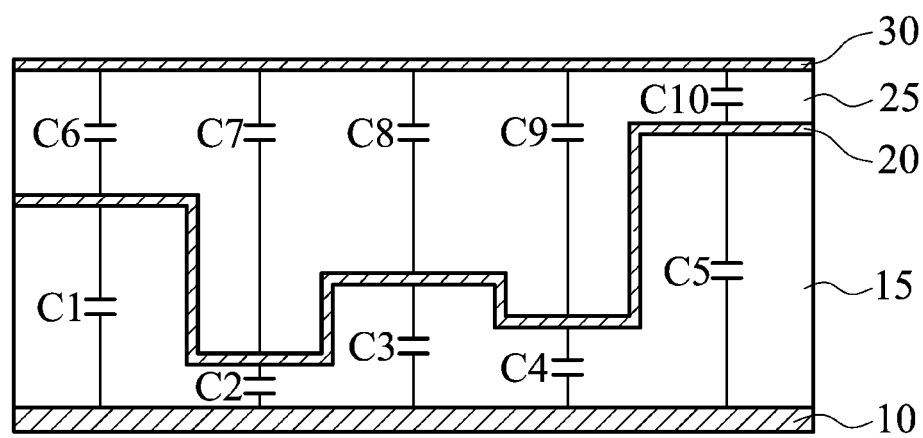

The capacitor structure of the present disclosure may comprise more than two layers of the electrode. FIG. 4a is a cross-section view of the capacitor structure of a fourth embodiment of the present disclosure. The capacitor structure comprises the first electrode layer 10, first dielectric layer 15, second electrode layer 20, second dielectric layer 25, and third electrode layer 30 disposed in sequence. In this embodiment, the first electrode layer 10 and third electrode layer 30 are flat electrodes and the second electrode layer 20 disposed therebetween has a peak-valley like structure. As shown in FIG. 4a, the capacitor may have parallel combinations of at least four base capacitances C1-C4. FIG. 4b illustrates a variation of the fourth embodiment. Similarly, the heights and depths of the peak-valley like structure of the second electrode layer 20 may be varied to create more base capacitances.

Figure 5A:
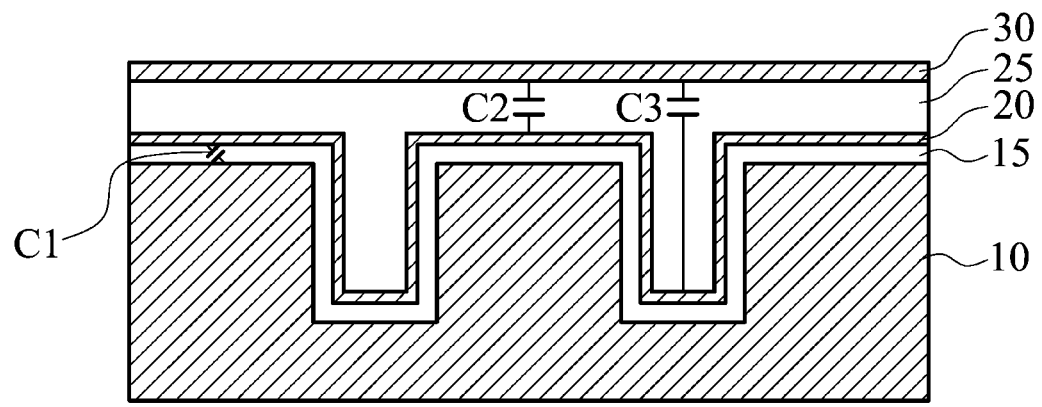
FIGS. 5a-5b are cross-section views of the capacitor structure according to the fifth exemplary embodiment of the present disclosure.
Figure 5B:
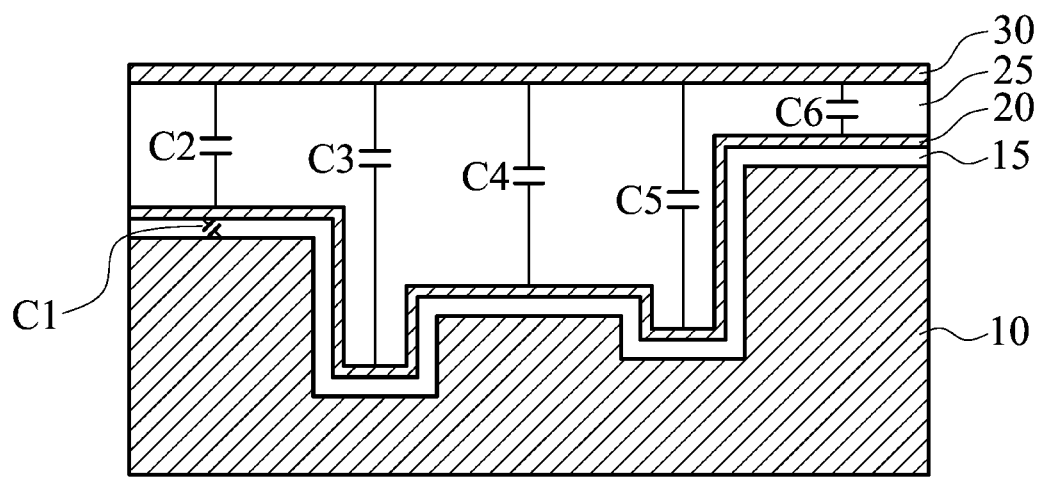

FIG. 5a illustrates a fifth embodiment of the present disclosure. The capacitor structure comprises three electrode layers 10, 20, 30 and two dielectric layers 15, 25 disposed between the electrode layers. The first electrode 10 and second electrode 20 are both peak-valley like structures, and only the third electrode is a flat electrode layer. There are two capacitances C2 and C3 between the second electrode 20 and third electrode 30 in the capacitor structure of FIG. 5a. There is a large capacitance C1 created by the thin and uniform first dielectric layer 15 disposed between the first electrode 10 and the second electrode 20. FIG. 5b illustrates a variation of the fifth embodiment. More base capacitances are created by varying the heights and depths of the peak-valley like structure of the second electrode layer 20.

Figure 6A:
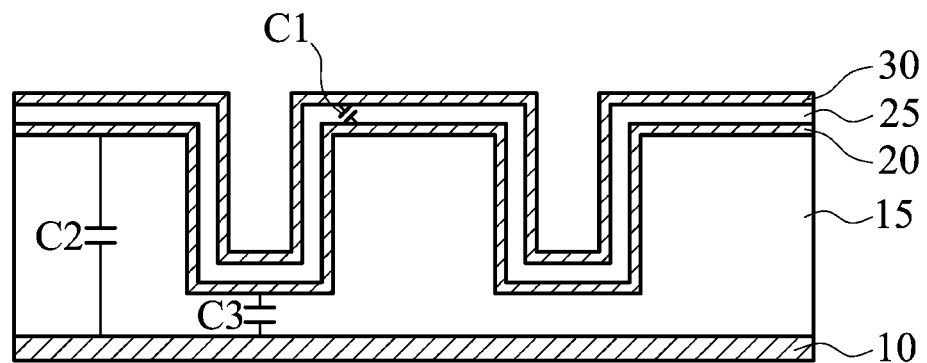
FIGS. 6a-6c are cross-section views of the capacitor structure according to the sixth exemplary embodiment of the present disclosure.
Figure 6B:
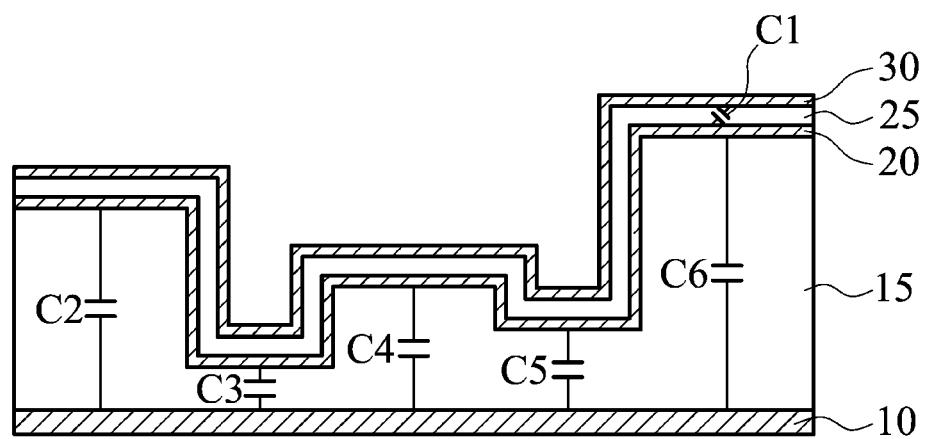
Figure 6C:
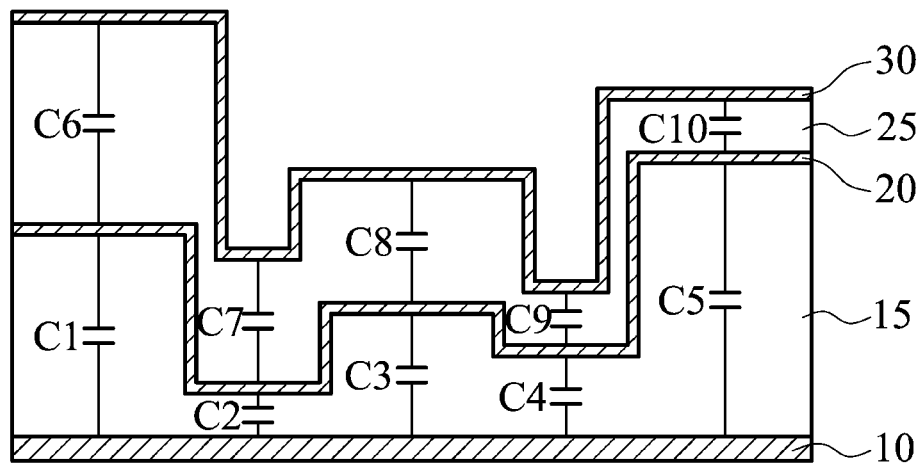

FIG. 6a illustrates a sixth embodiment of the present disclosure. The first electrode layer 10 is a flat electrode, and the second electrode layer 20 and third electrode layer are both peak-valley like structures. The capacitor structure has three capacitances C1, C2, and C3. FIG. 6b illustrates a variation of the sixth embodiment. In FIG. 6b, there are five capacitances C2-C6 between the first electrode layer 10 and the second electrode layer 20, and a single large capacitance C1 between the second electrode layer 20 and the third electrode layer 30. FIG. 6c illustrates another variation of the sixth embodiment. Compared with FIG. 6b, the capacitor structure of FIG. 6c has five capacitances between the second electrode layer 20 and third electrode 30.

Figure 7A:
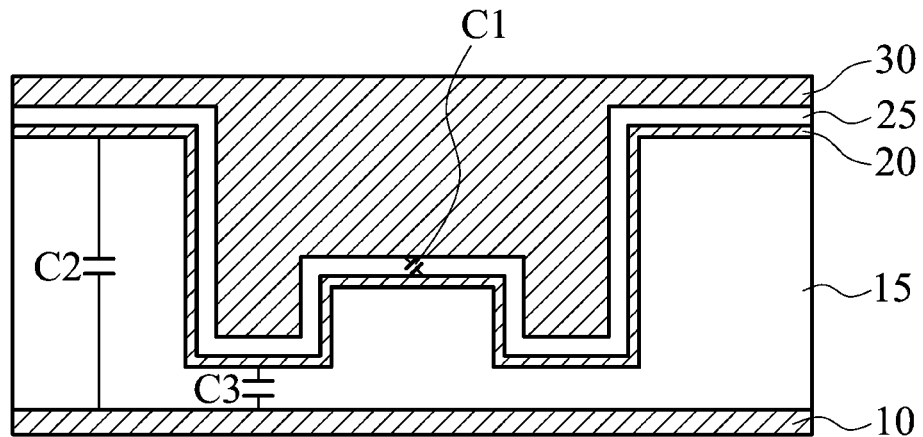
FIGS. 7a-7b are cross-section views of the capacitor structure according to the seventh exemplary embodiment of the present disclosure.
Figure 7B:
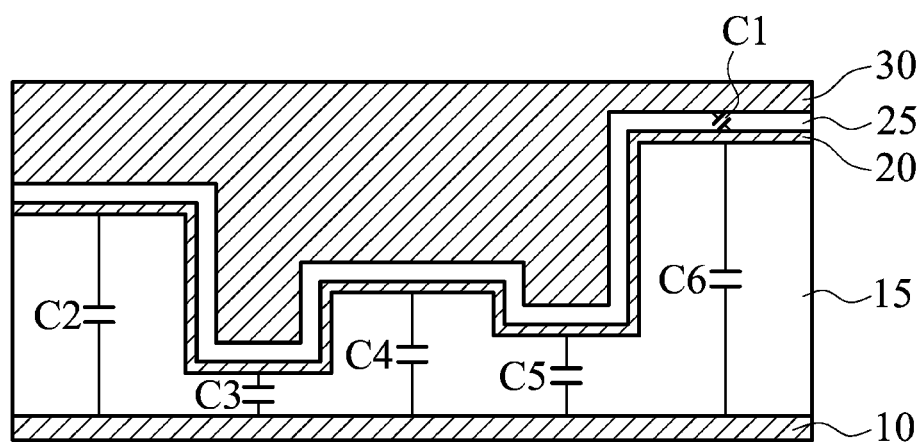

FIG. 7a illustrates a seventh embodiment of the present disclosure. In FIG. 7a, the first electrode layer 10 is a flat electrode, and the second electrode layer 20 and third electrode layer 30 are both peak-valley like structures. Compared with the structure of the sixth embodiment, the peak-valley like structure of the third electrode of FIG. 7a has a flat surface. Similarly, the peak-valley like structures of the second electrode layer 20 and the third electrode layer 20 may also have various depths and heights as shown in FIG. 7b.

Figure 8A:
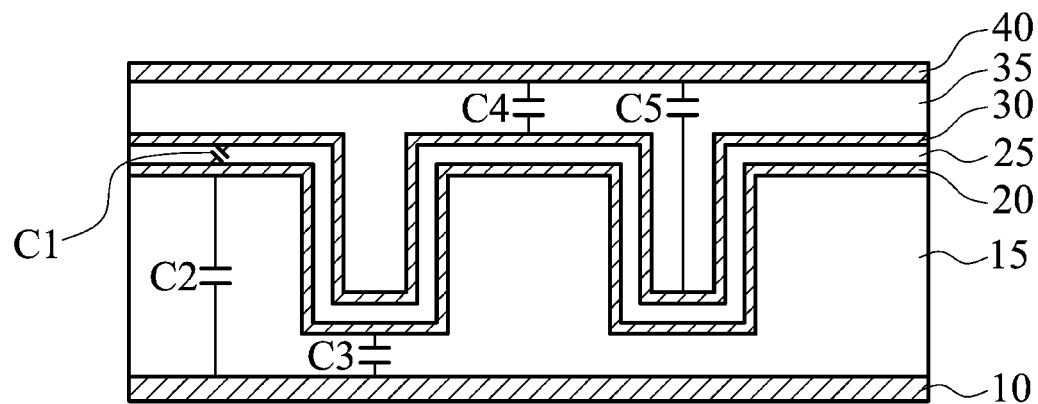
FIGS. 8a-8b are cross-section views of the capacitor structure according to the eighth exemplary embodiment of the present disclosure.
Figure 8B:
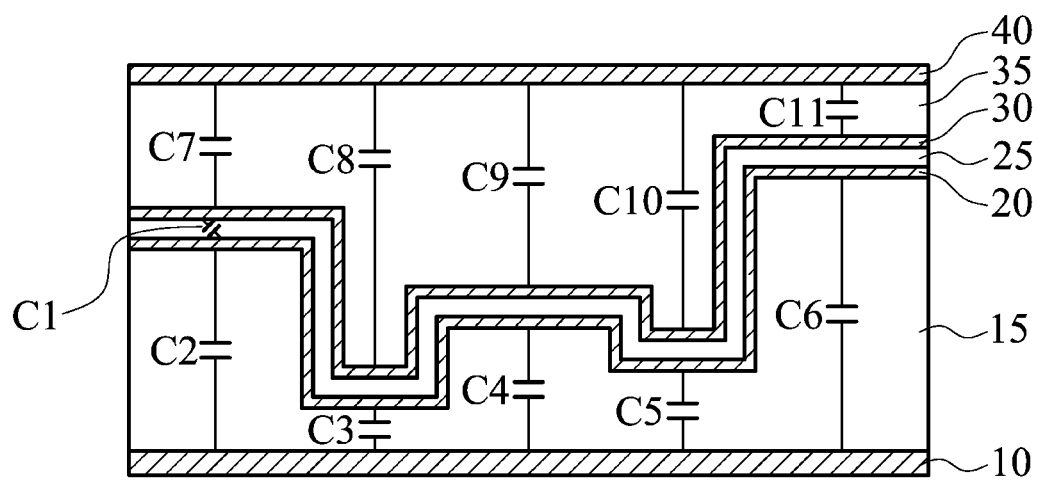

The capacitor structure of the present disclosure may also comprise more than three layers of the electrode. FIG. 8a is a cross-section view of the capacitor structure of an eighth embodiment of the present disclosure. In FIG. 8a a third dielectric layer 35 and a fourth electrode layer 40 are disposed on the third electrode layer 30. The first electrode layer 10 and fourth electrode layer 40 are flat electrodes, and the second electrode layer 20 and third electrode layer 30 are peak-valley like structures. Similarly, the peak-valley like structures of the second electrode layer 20 and third electrode layer 30 may also have various depths and heights as shown in FIG. 8b. In other embodiments, the first electrode layer 10 or the fourth electrode layer 40 may have the peak-valley like structure, which is not illustrated in detail with a figure.

The capacitor structures illustrated in the above embodiments may also have vias and traces (which are not shown in the figures) formed therein for coupling or connecting purpose while being used in a circuit.

Figure 9A:
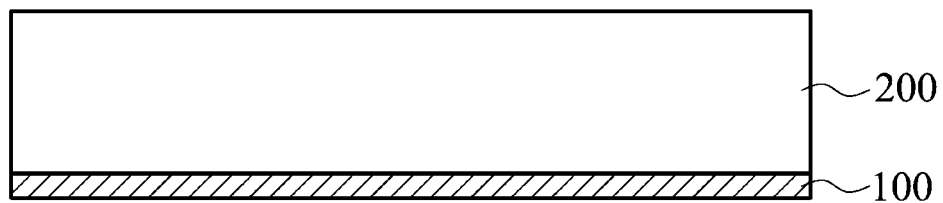
FIGS. 9a-9f illustrate a method for manufacturing the capacitor structure according to one exemplary embodiment the present disclosure.
Figure 9B:
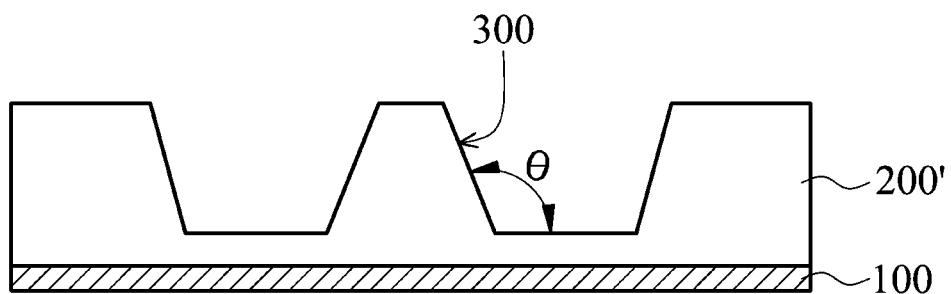

FIGS. 9a-9f illustrate a method for manufacturing the capacitor structure of the present disclosure. Referring to FIG. 9a, first, the first electrode layer 100 with the dielectric layer 200 formed thereon is provided. In one embodiment, the structure shown in FIG. 9a may be a resin coated copper (RCC). Then, the concave 300 of the dielectric layer 200' may be formed by an etching or preferably a mold press method, as shown in FIG. 9b. Note that utilizing the mold press method to form the concave can reduce cost. The mold press method does not need to coat a peak-valley like metal structure on a first conductive material by the electroplating, and thus cost is reduced and compatibility with subsequent processing is improved. The dielectric layer 200' has the concave 30 of an angle θ. The angle θ may be larger than 90 degrees. In other embodiments, the angle θ is about 90 degrees (not shown).

Figure 9C:
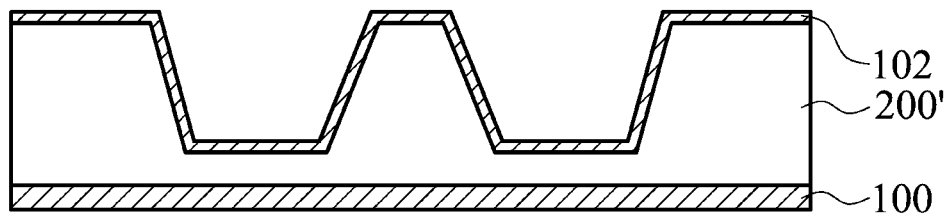
Figure 9D:
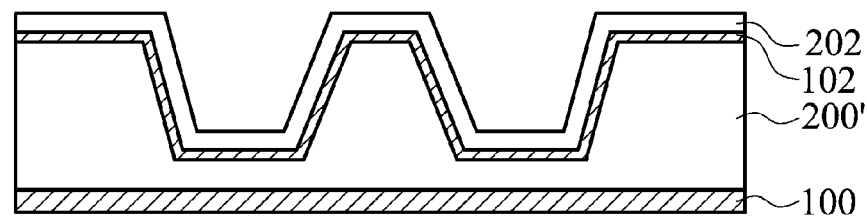
Figure 9E:
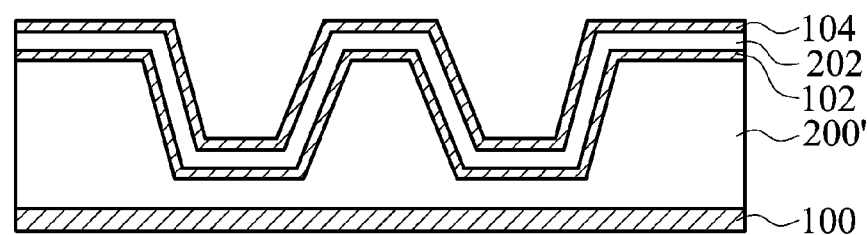
Figure 9F:
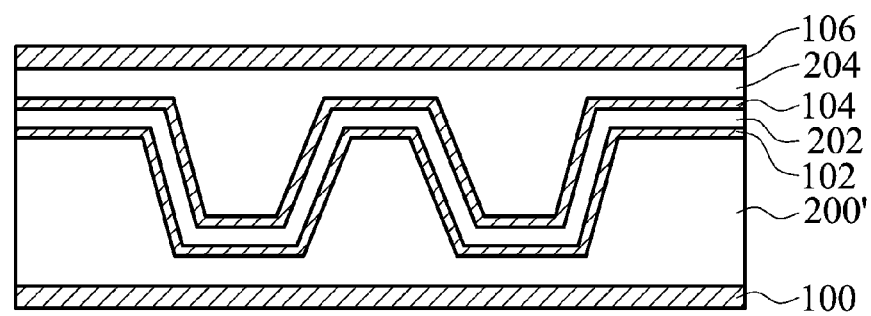

Referring to FIG. 9c, the electrode layer 102 is then formed on the dielectric layer 200'. Referring to FIG. 9d, the dielectric layer 202 is coated on the electrode layer 102 by the inkjet printing method, preferably. Referring to FIG. 9e, the electrode layer 104 is formed on the dielectric layer 202. Referring to FIG. 9f, the dielectric layer 204 is formed on the electrode layer 104, and the electrode layer 106 is then formed on the dielectric layer 204. In one embodiment, the laminate comprising the dielectric layer 204 and electrode layer 106 is formed on the electrode layer 104. In other embodiments, the formation steps of the capacitor structure further comprise steps for forming a via or trace (not shown in figures). It is noted that for increasing adhesion between the electrode layer and the dielectric layer, the electrode or dielectric surface may optionally be modified, or an additional reinforce material/layer may be inserted.

Figure 10:
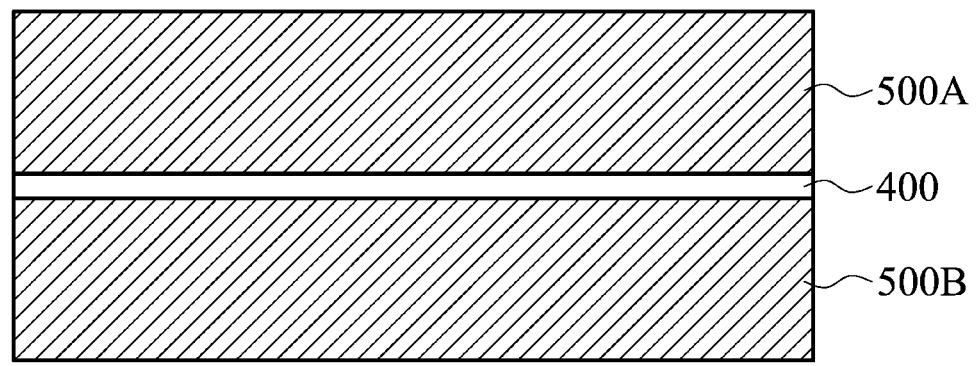
FIGS. 10a-10h illustrate a method for manufacturing the capacitor structure according to one another exemplary embodiment the present disclosure.
Figure 10:
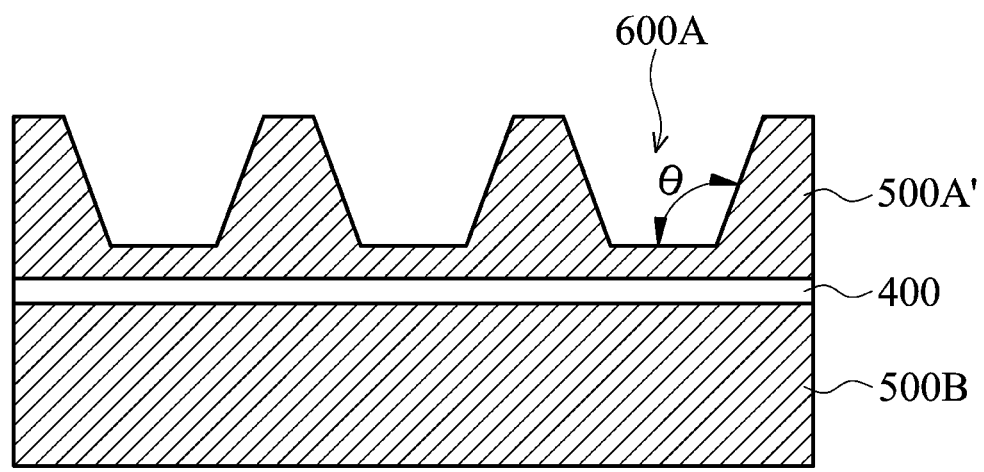
Figure 10:
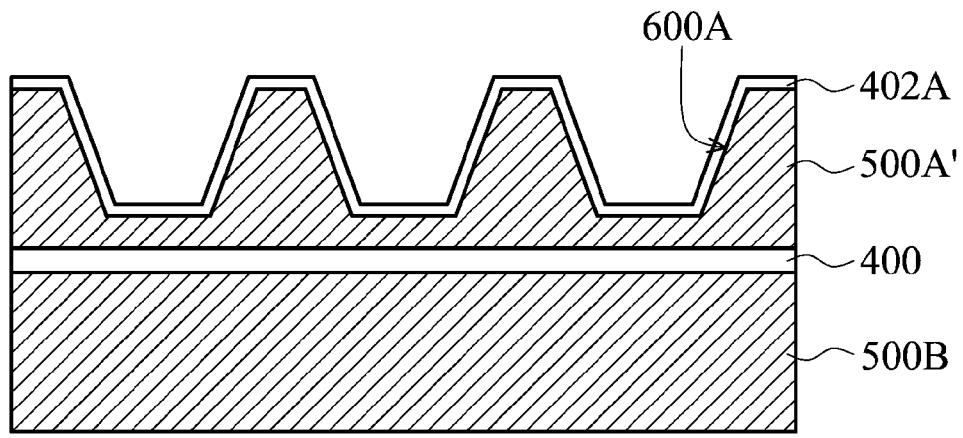
Figure 10:
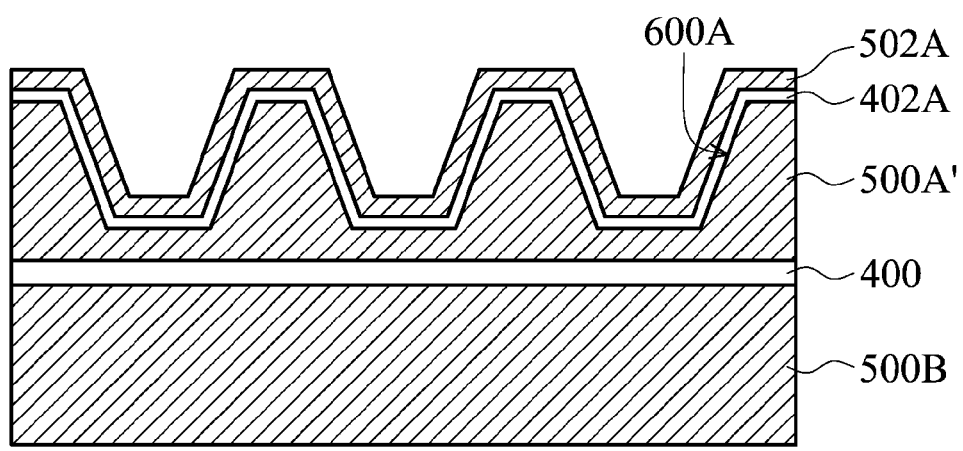
Figure 10:
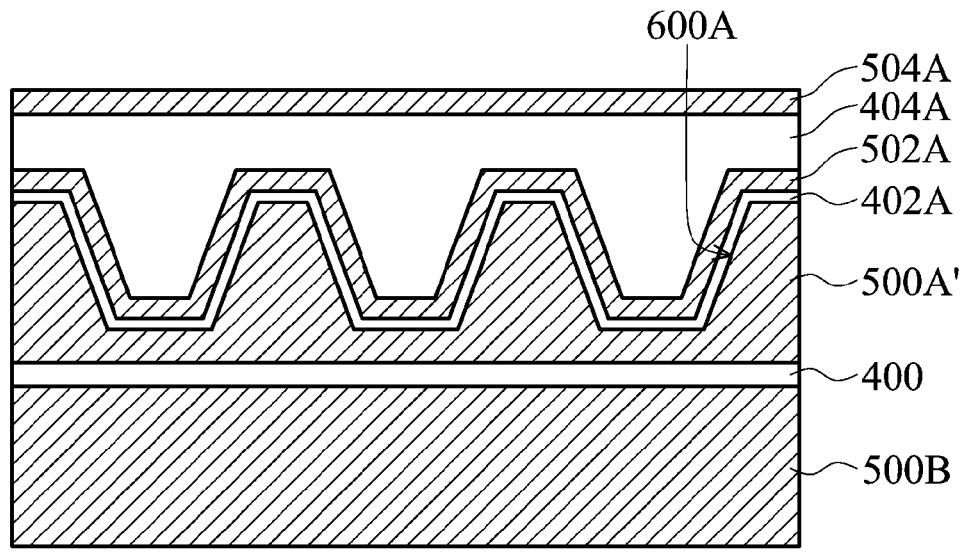
Figure 10:
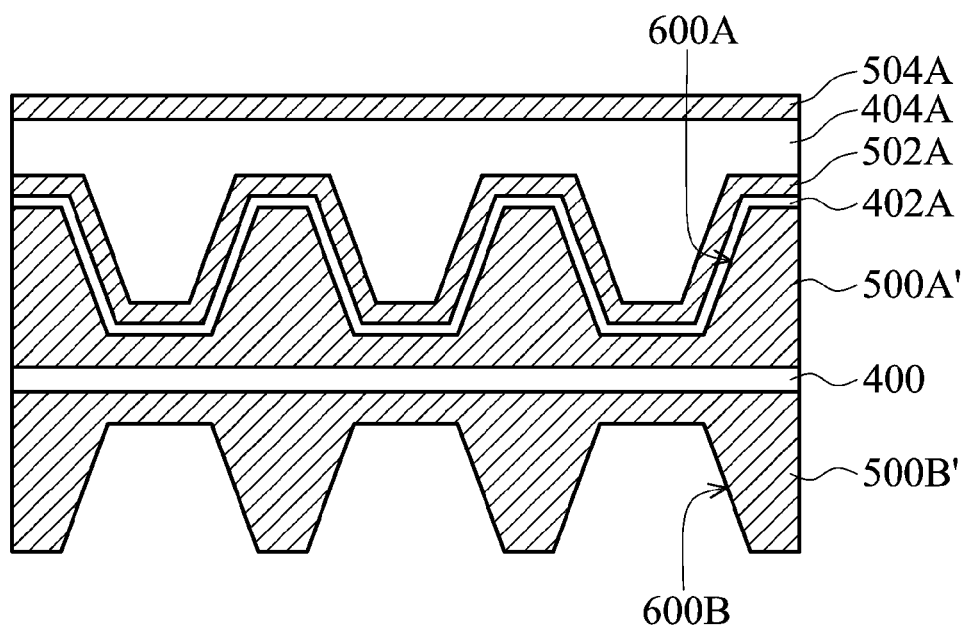

FIGS. 10a-10h illustrate a method for manufacturing the capacitor structure of another embodiment of the present disclosure. Referring to FIG. 10a, first, the top electrode layer 500 A and bottom electrode layer 500B are respectively disposed on and below the dielectric layer 400. In one embodiment, the structure shown in FIG. 10a is the double-sided printed circuit board having the high-k thin dielectric layer 400. The thicknesses of the top electrode layer 500A or the bottom electrode layer 500B may be the same or different.

Referring to FIG. 10b, the electrode layer 500A' having at least one concave 600A is formed by a wet or dry etching method or mold press method. The angle θ of the concave 600A is preferably larger than 90 degrees. In other embodiments, the angle θ of the concave is about 90 degrees (not shown).

Referring to FIG. 10c, the top dielectric layer 402A is conformally formed on the top electrode layer 500A'. Referring to FIG. 10d, the top electrode layer 502A is conformally formed on the top dielectric layer 402A. Referring to FIG. 10e, the top dielectric layer 404A is formed to entirely fill the concave 600A. The top dielectric layer 404A completely covers the top electrode layer 502A and has the flat upper surface. Then, the top electrode layer 504A is formed on the top dielectric layer 404A.

Next, referring to FIG. 10f, a portion of the bottom electrode layer 500B is removed to form the bottom electrode layer 500B'. The bottom electrode layer 500B' has at least one concave 600B. The angle θ of the concave 600B is preferably bigger than 90 degrees. In other embodiments, the angle θ is about 90 degrees (not shown). The shapes of the concave 600A or 600B may be the same or different.

Figure 10G:
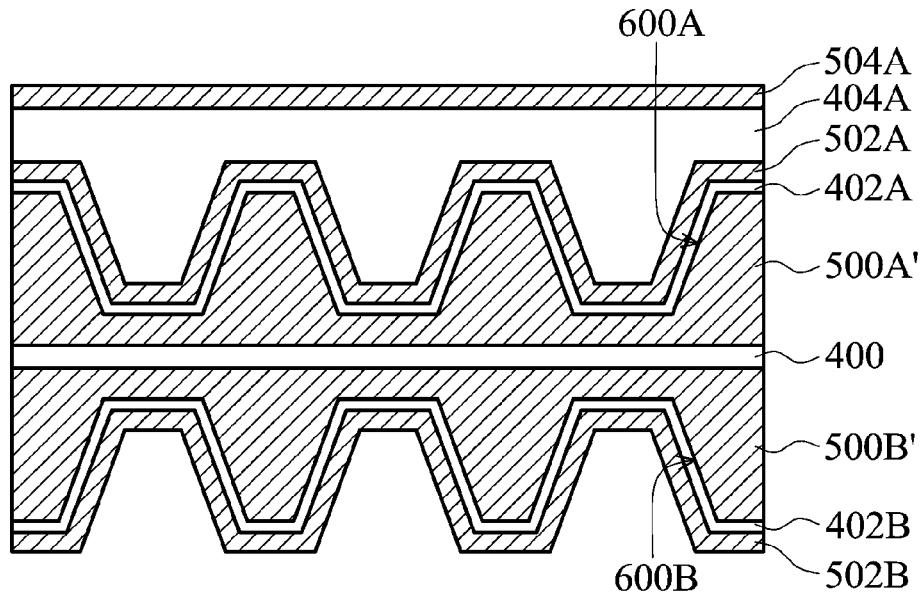
Figure 10H:
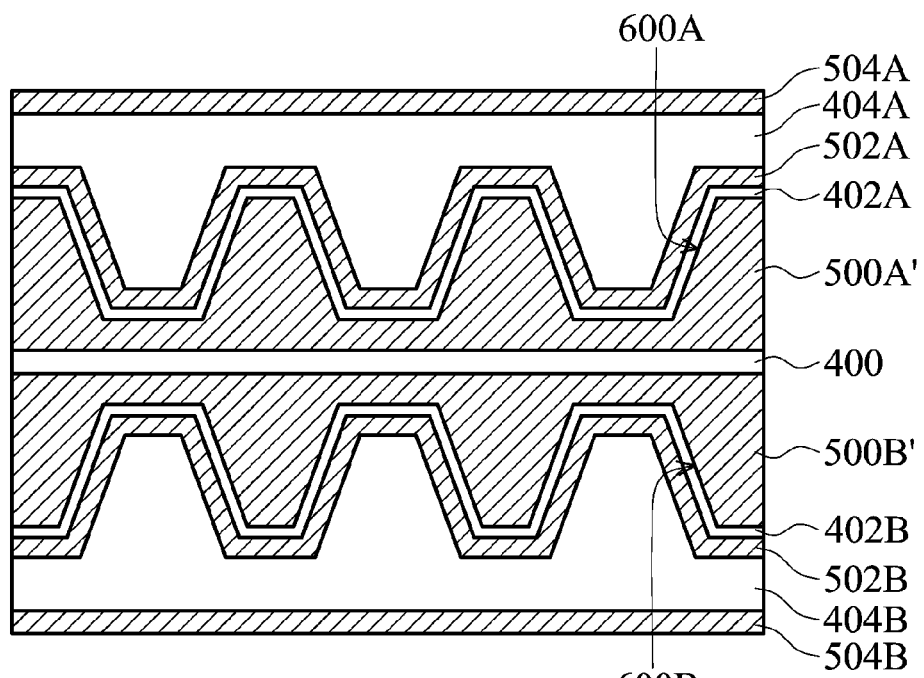

Referring to FIG. 10g, the bottom dielectric layer 402B is formed under the bottom electrode layer 500B'. Next, the bottom electrode layer 502B is formed under the bottom dielectric layer 402B. Referring to FIG. 10h, the bottom dielectric layer 404B is formed to fill the concave 600B. The bottom dielectric layer 404B may be extended to the lower surface of the bottom electrode layer 502B, and have the flat lower surface. Then, the bottom electrode layer 504B is formed under the bottom dielectric layer 404B.

In the embodiment shown in FIGS. 10a-10h, one capacitor structure is first formed on the dielectric layer 400, and another capacitor structure is then formed under the dielectric layer 400. However, in other embodiments, the capacitor structures on and under the dielectric layer 400 may be simultaneously formed by the same processes. In addition, the capacitor structures on and under the dielectric layer 400 may be asymmetrical. For example, the upper concave 600A and lower concave 600B may be not aligned, and may be staggeredly arranged. Moreover, the upper concave 600A and lower concave 600B may have different depths. The formation steps of the capacitor structure further comprise steps for forming a via or trace (not shown in figures). For increasing adhesion between the electrode layer and the dielectric layer, the electrode or dielectric surface may be optionally modified, or an additional reinforce material/layer may be inserted.

Figure 11A:
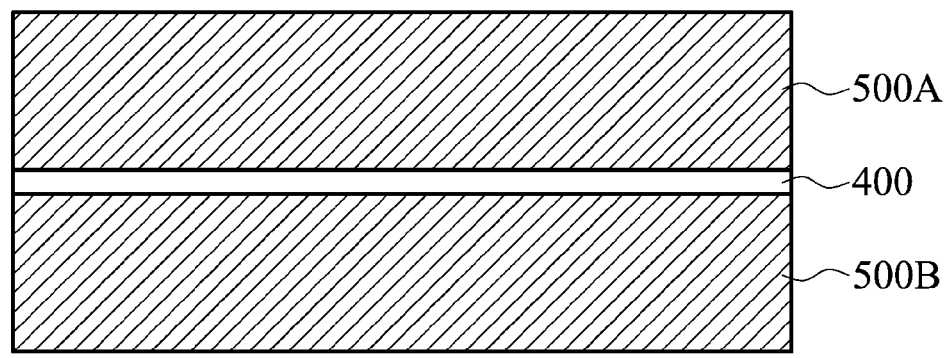
FIGS. 11a-11f illustrate a method for manufacturing the capacitor structure according to yet another exemplary embodiment the present disclosure.

FIGS. 11a-11f illustrate a method for manufacturing the capacitor structure of yet another embodiment of the present disclosure. Referring to FIG. 11a, first, the electrode layer 500 A and electrode layer 500B are respectively disposed on and below the dielectric layer 400. In one embodiment, the structure shown in FIG. 11a is the double-sided printed circuit board having the high-k thin dielectric layer 400.

Figure 11B:
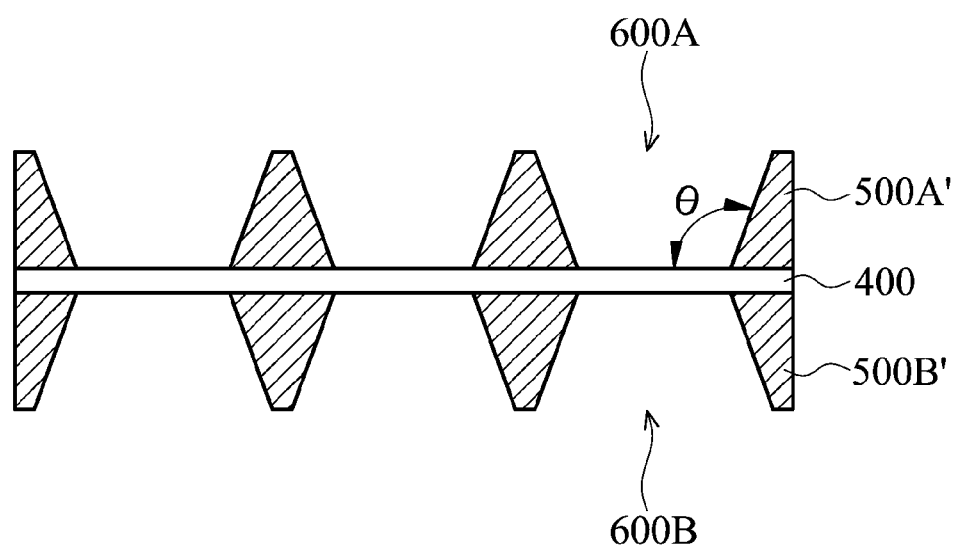

Referring to FIG. 11b, the electrode layer 500A' having the concave 600A and the electrode layer 500B' having the concave 600B are formed by the wet or dry etching method. The concaves 600A and 600B may be formed simultaneously by a single step, or formed separately by individual steps. In this embodiment, the concaves 600A and 600B expose the upper surface and lower surface of the dielectric layer 400 respectively. In one embodiment, the electrode layer 500A' and the electrode layer 500B' are staggered (i.e. asymmetrical structures) (not shown), and thus mechanical strength of the thin high-k dielectric layer 400 may be improved to sufficiently bear subsequent processes and prevent cracks.

Figure 11C:
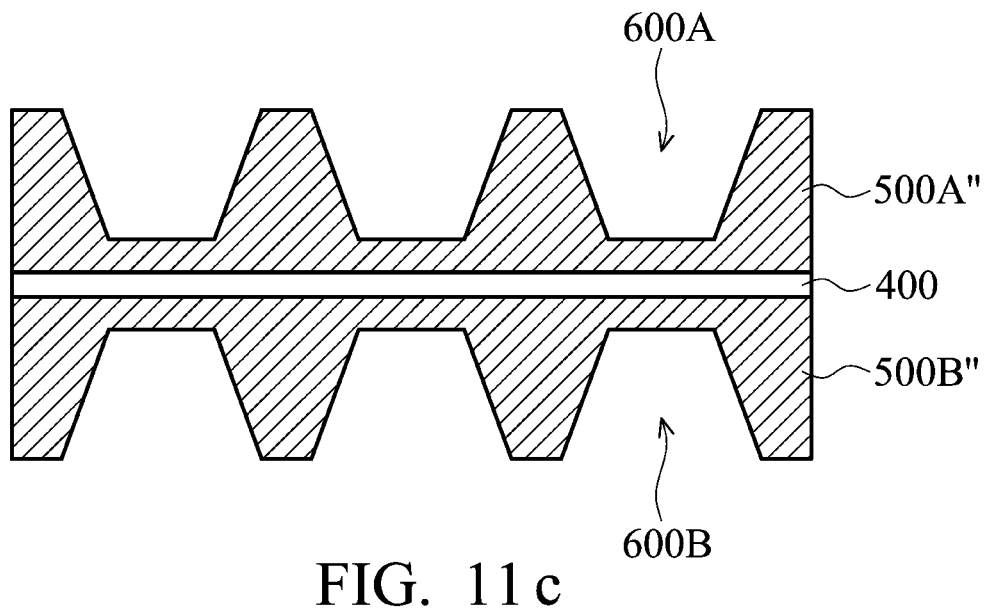

Referring to FIG. 11c, after the concaves 600A and 600B are etched, the capacitor structures 500A" and 500B" are formed by forming conformal electrode layers to cover the electrode layer 500A' and 500B' and exposing the upper surface and lower surface of the dielectric layer 400. The electrode layer 500A" is constructed with the electrode layer 500A' and the conformal electrode layer disposed on the electrode layer 500A'. The electrode layer 500B" is constructed with the electrode layer 500B' and the conformal electrode layer disposed on the electrode layer 500B'. The conformal electrode layers may be formed by the plating method incorporated with the seed metal electro-less plating method or the sputtering method, etc.

Figure 11D:
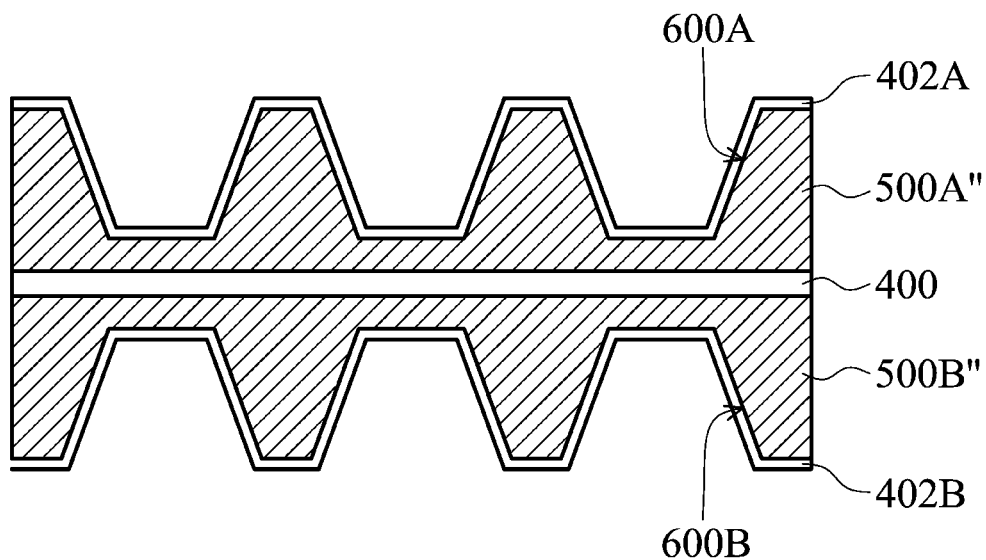
Figure 11E:
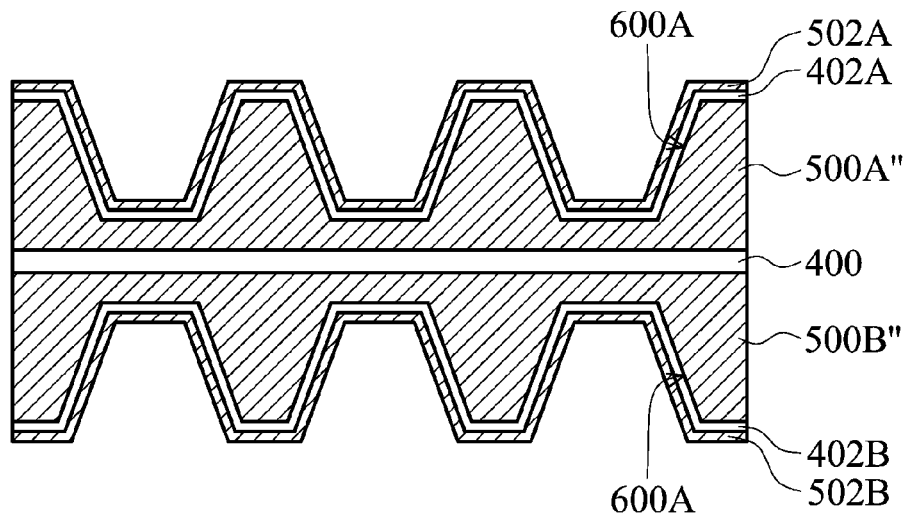

Referring to FIG. 11*d*, the conformal dielectric layers 402A and 402B are respectively formed in the concaves 600A and 600B. Referring to FIG. 11*e*, the electrode layers 502A and 502B are respectively formed on the dielectric layers 402A and 402B by the printing, sputtering, or electroplating method.

Figure 11F:
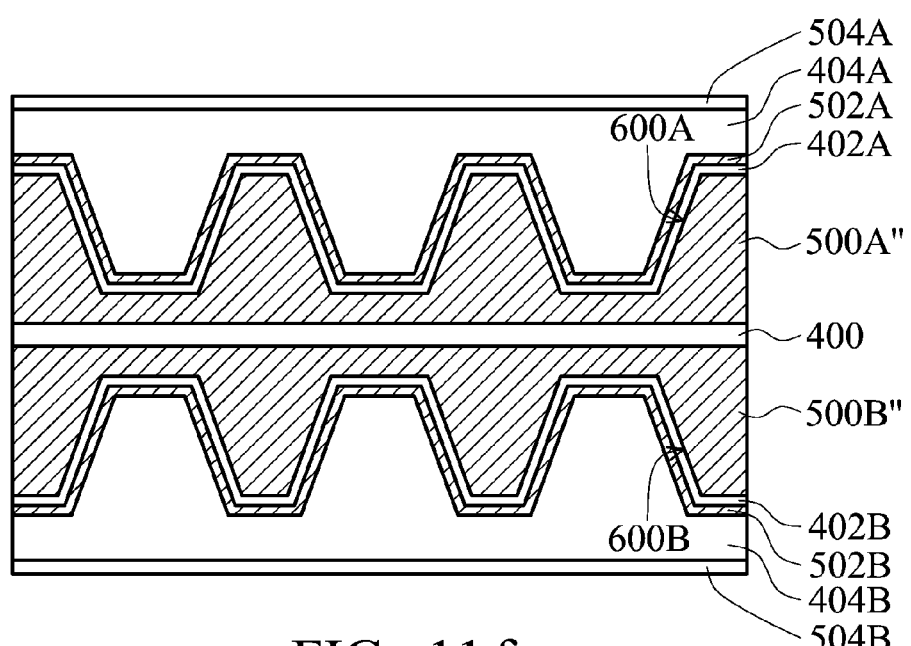

Referring to FIG. 11*f*, the dielectric layer 404A and electrode layer 504A, and the dielectric layer 404B and electrode layer 504B are respectively formed on the concaves 600A and 600B. In one embodiment, the resin coated coppers having the dielectric layer 404A and electrode layer 504A, and having the dielectric layer 404B and electrode layer 504B are pressed to form the capacitor structure shown in FIG. 11*f*.

Figure 12:
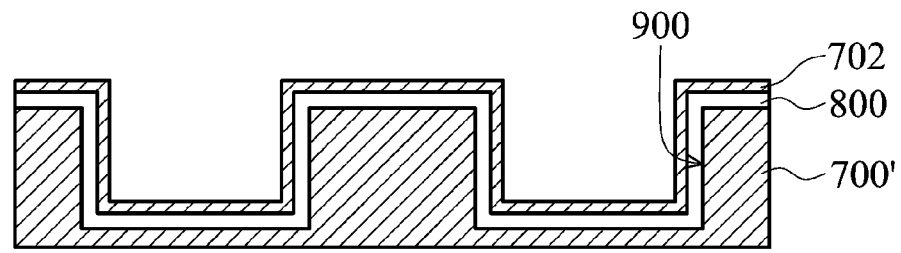
FIGS. 12a-12f illustrate an exemplary embodiment of an application for the capacitor structure of the present disclosure.
Figure 12:
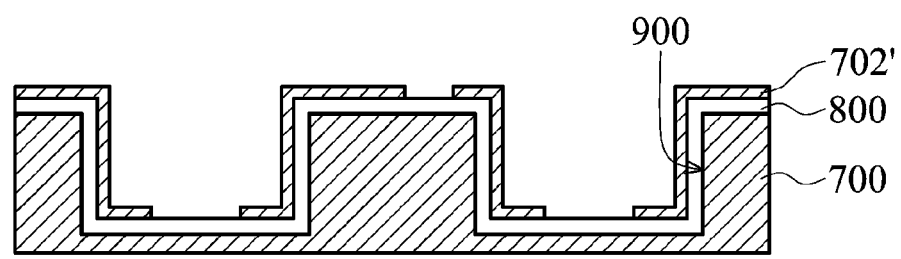
Figure 12:
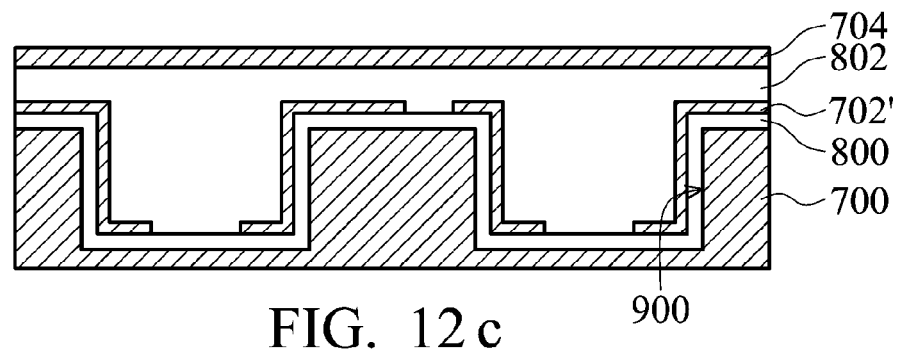
Figure 12:
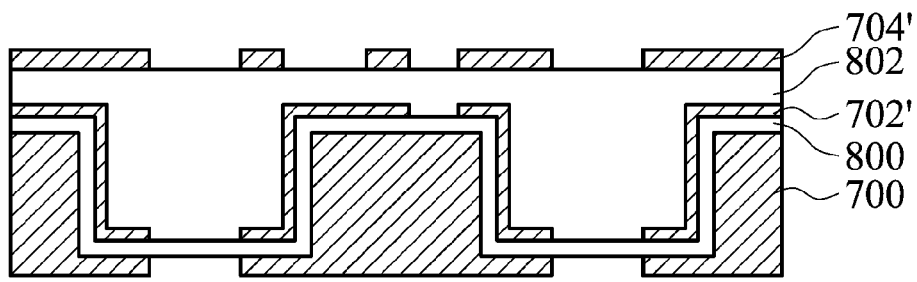
Figure 12:
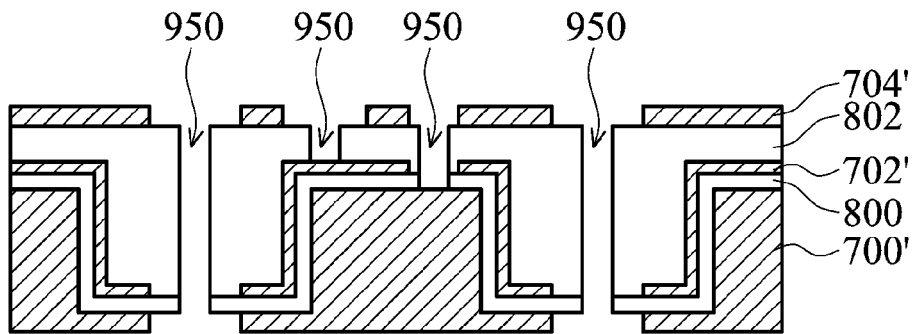
Figure 12:
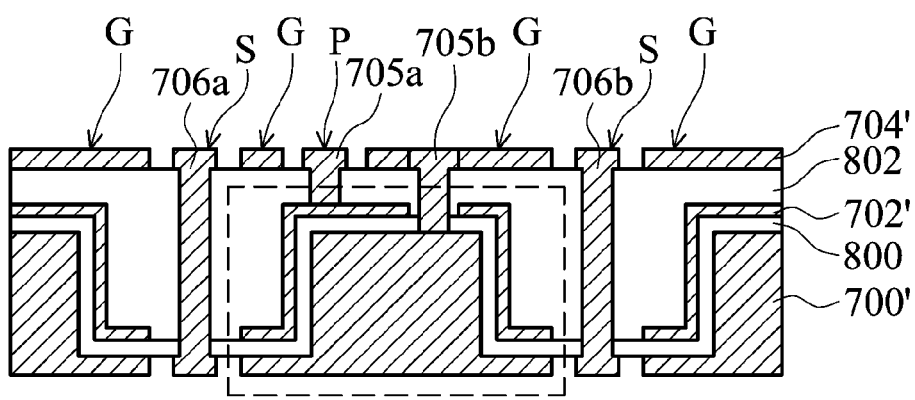

The capacitor structures of the present disclosure may be used in PCBs, interposers, IC substrates, or IC devices to inhibit noises. FIGS. 12*a*-12*f* illustrates an embodiment of an application for a capacitor structure of the present disclosure. Referring to FIG. 12*a*, first the dielectric layer 800 and electrode layer 702 are sequentially formed on the electrode layer 700 having the concave 900. Referring to FIG. 12*b*, a portion of the electrode layer 702 may be removed by the laser method for forming the electrode layer 702'. Referring to FIG. 12*c*, the resin coated copper comprising the dielectric layer 802 and electrode layer 704 is laminated on the structure of FIG. 12*b*. Next, a portion of the electrode layers 704 and 700 are removed by the dry etching or wet etching method for forming the electrode layers 704' and 700' as shown in FIG. 12*d*.

Referring to FIG. 12*e*, the dielectric layer 802 and dielectric layer 800 are drilled for forming the hole 950. The hole 950 may be formed by the mechanical drilling, laser drilling or photolithography method. Referring to FIG. 12*f*, the first vias 705*a* and 705*b* and the second vias 706*a* and 706*b* are formed by filling the hole 950 with the conductive layer. The symbols G, S, P in the figure indicate the ground, signal, and power. It is understood from the figure that the first via 705*a* passes through the dielectric layer 802 to connect with the electrode layer 702' and the first via 705*b* passes through the dielectric layers 802 and 800 to connect with the electrode layer 700'. Therefore, the electrode layers 702' and 700' are connected to the external electric power P and electric ground G by the first vias 705*a* and 705*b* respectively. On the other hand, the second vias 706*a* and 706*b* passes through the dielectric layers 800 and 802, and passes through the whole capacitor structure. In addition, the second vias 706*a* and 706*b* not connected with the electrode layers 702' and 700' are used for transmitting signals. As shown in this figure, the concaves having a flat bottom is particularly suitable for disposing the via or trace, which is an advantage afforded by embodiments of the invention.

Compared with the parallel electrodes, the power P and ground G having the peak-valley like structure can shield interference between different signals. Specifically, the signal S may pass through the whole capacitor structure with the second vias 706*a* and 706*b* for transmitting signals, as shown in FIG. 12*f*. Moreover, electromagnetic radiation waves induced during signal transmission may be absorbed by the capacitor structure as shown in FIG. 12*f*. The capacitor structure may be designed to have the convex structure (indicated with the dotted line) between the two signals S. The electrode layers 702' and 700' in the convex structure are connected to the power P and ground G respectively by the first vias 705*a* and 705*b*. The structure is effective for inhibiting the electromagnetic radiation waves induced during the high-frequency and high-speed signal transmission.

FIGS. 13-16 illustrate embodiments of applications for the capacitor structures of the present disclosure. Series or parallel combinations of the capacitor structures may be obtained by the various connecting methods of the conductive layers and vias. In addition, one skilled in the art may connect the conductive layers to the power, ground, or signal respectively according to requirements.

Figure 13:
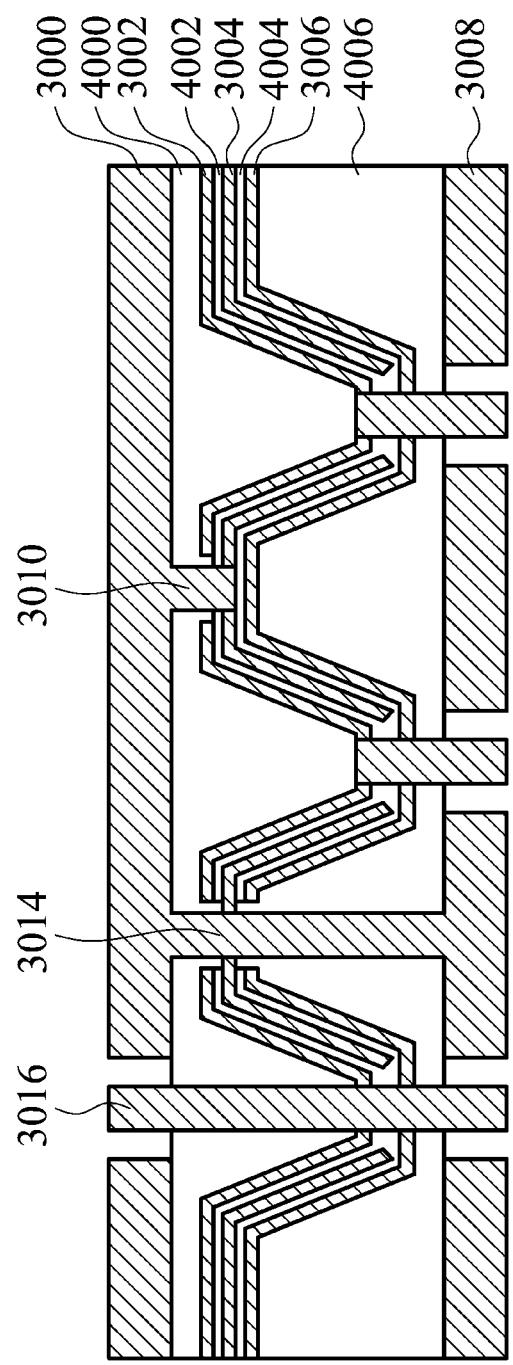
FIGS. 13-16 illustrate exemplary embodiments of applications for the capacitor structures of the present disclosure.

FIG. 13 illustrates the ultra-thin core joined with the wide band decoupling capacitor structures of the present disclosure. In FIG. 13, the capacitor structure comprises the electrode layers 3000, 3002, 3004, 3006, 3008, 3010, 3014, and 3016, and the dielectric layers 4000, 4002, 4004, and 4006. The dielectric layers 4000 and 4006 are preferably the high-k dielectric layers having thicknesses of about 50 um. The dielectric layers 4000 and 4002 are conformal high-k dielectric layers. The electrode layers 3000 and 3008 are preferably copper foils. The thickness of the whole structure is about 60 um preferably. In conventional IC substrate applications, the size of the substrate is relatively small, and is usually about 35 mm×35 mm. In addition, the active and passive areas supported on the substrate are finite. Such substrates are usually concerned with simultaneous switching noise (SSN) interference. The capacitor structure of the present disclosure has multiple capacitances, and thus provides multiple resonant frequency points. Therefore, the impedance bandwidth of the capacitor is widened to achieve inhibition of wideband SSN interference. The ultra-thin core joined with the wide band decoupling capacitor structure of the present disclosure is suitable for applications in cell phones, personal digital assistants (PDA), module boards of notebooks and so on, and micro high density interconnections (HDI).

Figure 14:
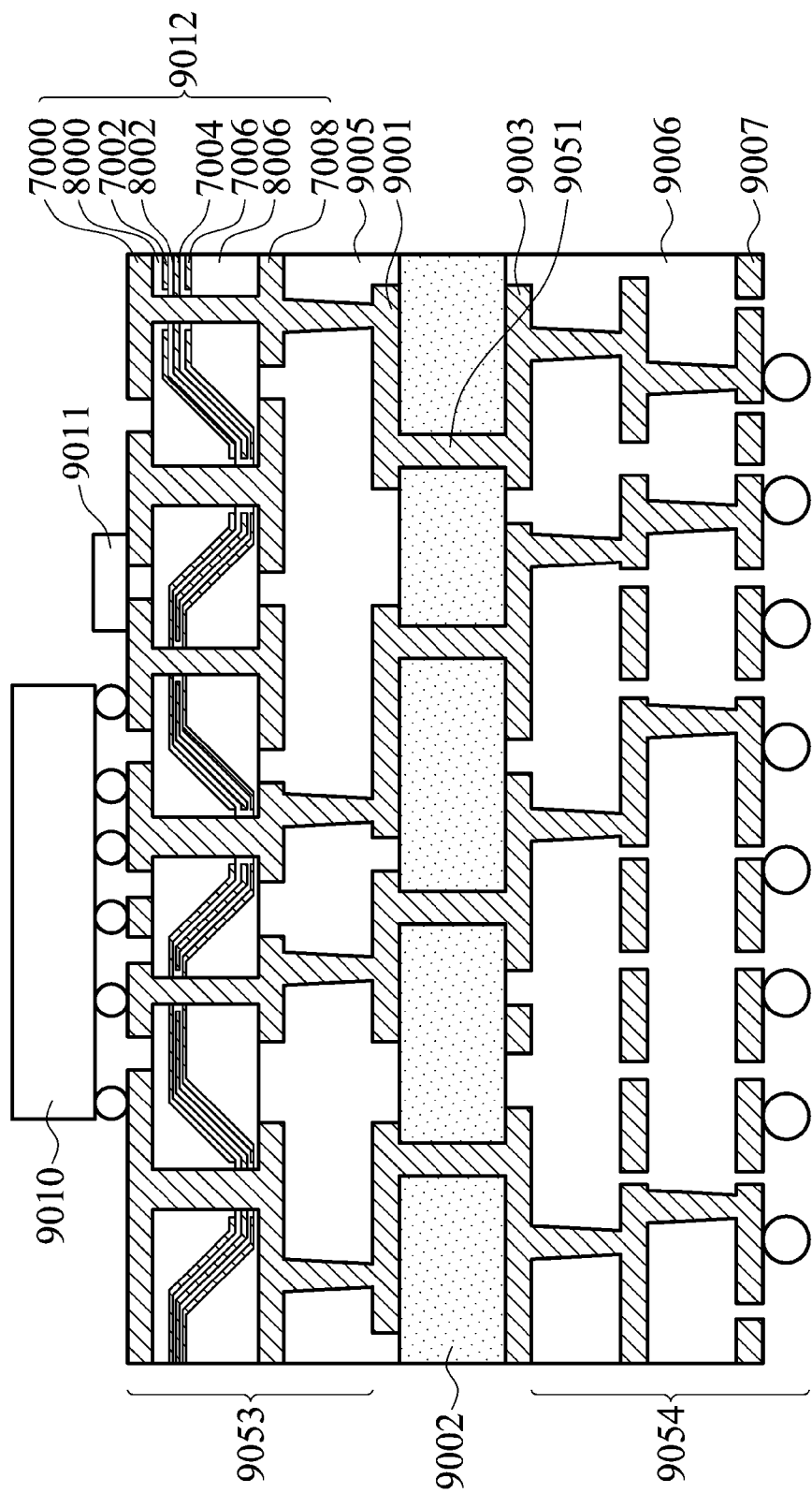

FIG. 14 illustrates the package structure with the capacitor structure shown in FIG. 13. The capacitor structure 9012 comprises the electrode layers 7000, 7002, 7004, 7006, and 7008, and the dielectric layers 8000, 8002, and 8006. The package structure may comprises the via 9051. As shown in FIG. 14, the via 9051 may be formed in each of the films of the package structure to connect the upper electrode layer and lower electrode layer and provide parallel connection or series connection of the capacitor structure. The package structure comprises the electrode layer 9003. The core layer 9002 between the electrode layer 9001 and the electrode layer 9003 may comprise a PCB, silicon, ceramic, or glass. The build-up layers 9053 and 9054 that comprise the dielectric layers may be respectively formed on and under the core layer 9002. The electrode layer 9007 may be formed under the build-up layer 9006. In this embodiment, the capacitor structure 9012 is formed in the upper portion of the build-up layer 9053, adjacent to the chip (or the substrate having the chip thereon) 9010 or the surface mounted device (SMD) 9011, to inhibit SSN interference. However, the placement of the capacitor structure is not limited to the position shown in FIG. 14. In other embodiments, the capacitor structure may disposed in other positions of the package structure, such as in the lower portion of the build-up layer 9053, or in the upper or lower portion of the build-up layer 9054, or at the position of the core layer 9002. Moreover, the capacitor structure used in the package application is not limited to the structure shown in FIG. 13. The capacitor structures of the other embodiments may be used.

Figure 15:
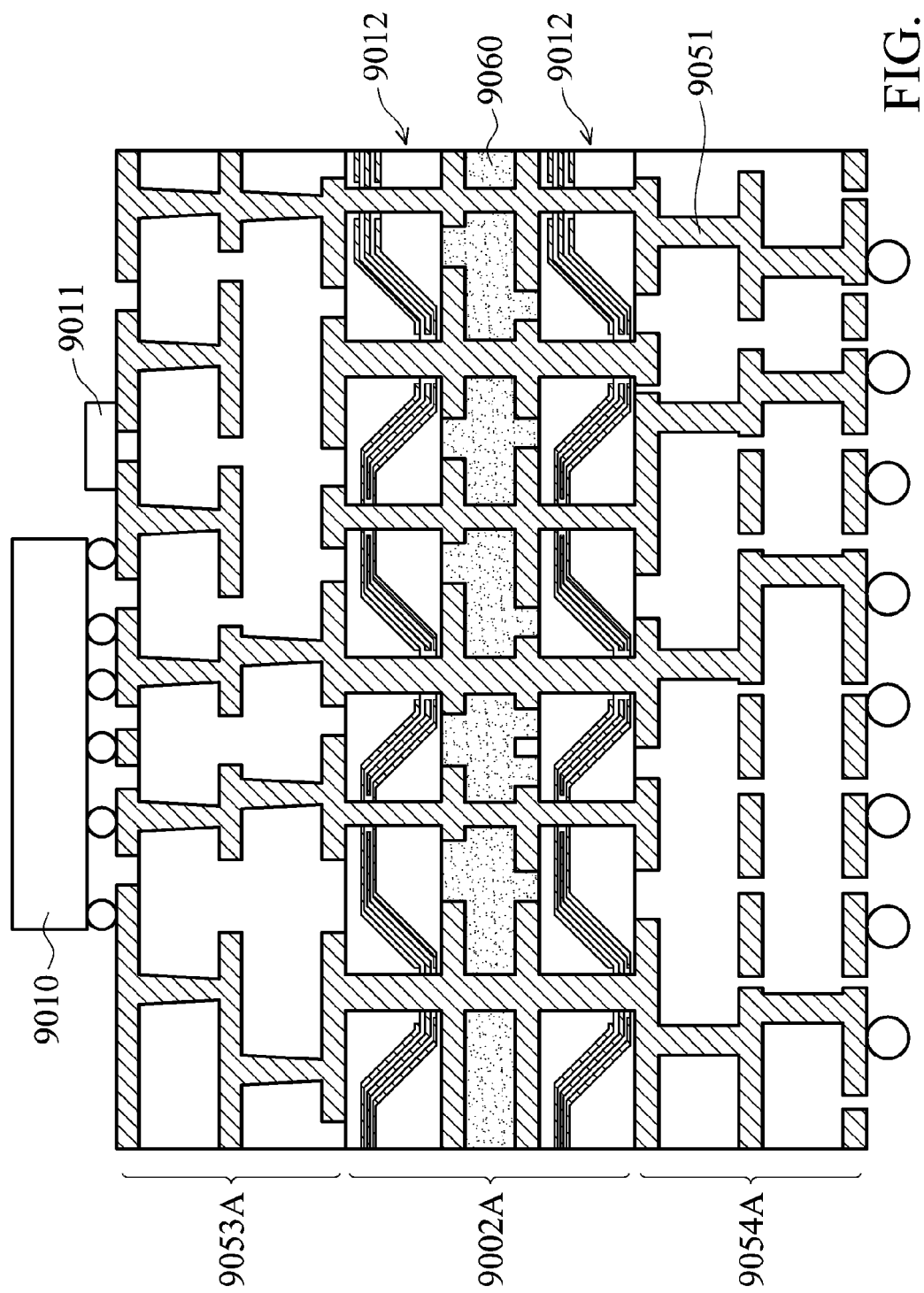

FIG. 15 illustrates the package structure with the capacitor structure according to another embodiment of the present disclosure. The main difference between FIG. 15 and FIG. 14 is that the capacitor structure 9012 of the embodiment shown in FIG. 15 is formed in the lower portion of the build-up layer 9053A and the upper portion of the build-up layer 9054A. Moreover, the upper portion and the lower portion of the package structure are connected by the bonding layer 9060 formed with the high-k material. In other embodiments, the capacitor structure may be disposed at any appropriate position in the package structure (not shown), such as in the upper or middle portion of the build-up layer 9053A, or in the middle or lower portion of the build-up layer 9054A, or at the position of the core layer 9002A.

Figure 16:
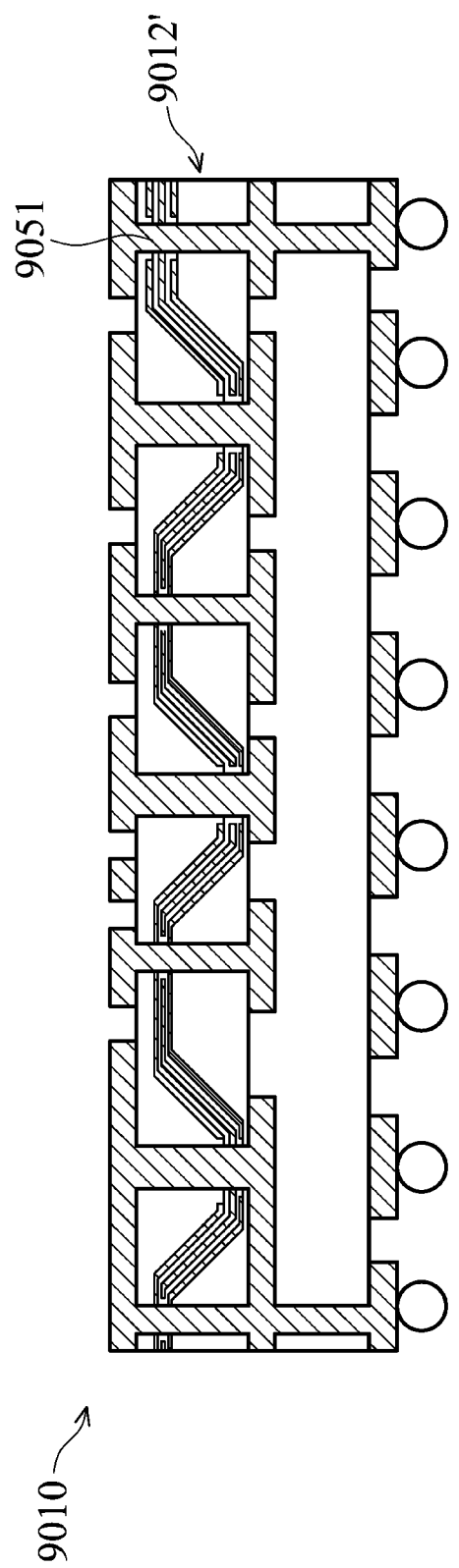

FIG. 16 illustrates the capacitor structure applied in an IC chip 9010 of another embodiment of the present disclosure. The conductive layer 9051 may be formed in the through-silicon via (TSV) passing through the IC chip 9010. The capacitor structure 9012' may be formed in the upper portion of the IC chip 9010. In other embodiments, the capacitor structure may be formed at any appropriate position in the IC chip 9010, such as the back surface or front surface of the chip. In addition, the signal from the chip may be transmitted out through the ground (G) via, signal (S) via, and power (P) via, and so on in the capacitor structure. Moreover, the capacitor structure used in the IC chip application is not limited to the structure shown in FIG. 13. The capacitor structure may be a capacitor structure disclosed in other embodiments.

Accordingly, the embodiments of the present disclosure use the substrate having concave and/or convex to form the capacitor structure, and thus can provide the more effective areas with the limitation of the fixed substrate area. The thin electric layer is formed between the electrode layers, thereby providing higher capacitance and improving inhibition of noise. Moreover, the capacitor structure may have parallel combinations with more capacitances to increase the impedance bandwidth by the method of varying the shape and structure of the dielectric layer, electrode layer, concave and/or convex. With the capacitor structure having the thin dielectric layer and the dielectric layer of various thicknesses that have multiple capacitances, the capacitor structure has wide bandwidth and low impedance effect, suitable for the low, middle, and high band applications, such as decoupling capacitor. Thus providing an electronic circuit with a decoupling capacitor, capable of inhibiting noise at different bands.

While the disclosure has been described by way of example and in terms of the exemplary embodiments, it is to be understood that the disclosure is not limited to the illustrated embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A capacitor structure, comprising:
   a first electrode layer having a peak-valley like structure, the peak-valley like structure of the first electrode layer having at least one first convex portion and at least one first concave portion;
   a first dielectric layer disposed over the first electrode layer, wherein the first dielectric layer has a uniform thickness between 0.1 μm and 10 μm;
   a second electrode layer having a peak-valley like structure disposed over the first dielectric layer, the peak-valley like structure of the second electrode layer having at least one second convex portion and at least one second concave portion, the at least one second concave portion inserted in the at least one first concave portion, the at least one first convex portion inserted in the at least one second convex portion;
   a second dielectric layer disposed over the second electrode layer; and
   a third electrode layer disposed over the second dielectric layer,
   wherein at least two gaps are formed between the peak-valley structure of the second electrode layer and the third electrode layer, thereby providing parallel combinations of at least two different capacitances.

2. The capacitor structure as claimed in claim 1, wherein the third electrode layer is a flat electrode.

3. The capacitor structure as claimed in claim 1, wherein the third electrode layer has a peak-valley like structure.

4. The capacitor structure as claimed in claim 1, further comprising:
   a third dielectric layer disposed over the third electrode layer; and
   a fourth electrode layer disposed over the third dielectric layer.

5. The capacitor structure as claimed in claim 4, wherein the fourth electrode layer is a flat electrode.

6. The capacitor structure as claimed in claim 4, wherein the fourth electrode layer has a peak-valley like structure.

7. The capacitor structure as claimed in claim 1, further comprising at least one via connecting the capacitor structure to one other capacitor structure by series connection or parallel connection.

8. The capacitor structure as claimed in claim 1 is used in a PCB.

9. The capacitor structure as claimed in claim 1, wherein each of the first and second concave portions has a flat bottom.

10. The capacitor structure as claimed in claim 1, wherein the first dielectric layer is epoxy resin, polyimide, ABF (Ajinomoto build-up film), BT (Bismaleimide Triacine) or combinations thereof.

11. A capacitor structure, comprising:
   a first electrode layer having a peak-valley like structure, the peak-valley like structure of the first electrode layer having at least one first convex portion and at least one first concave portion;
   a first dielectric layer disposed over the first electrode layer, wherein the first dielectric layer has a uniform thickness between 0.1 μm and 10 μm;
   a second electrode layer having a peak-valley like structure disposed over the first dielectric layer, the peak-valley like structure of the second electrode layer having at least one second convex portion and at least one second concave portion, the at least one second concave portion inserted in the at least one first concave portion, and the at least one first convex portion inserted in the at least one second convex portion;
   a second dielectric layer disposed over the second electrode layer;
   a third electrode layer disposed over the second dielectric layer;
   a first via passing through the second dielectric layer and connected to the at least one second convex portion of the second electrode layer;
   another first via passing through the second dielectric layer, the second electrode layer and the first dielectric layer, connected to the at least one first convex portion of the first electrode layer and not connected to the second electrode layer; and two second vias passing through the second and the first dielectric layers and not connected to the first electrode layer and the second electrode layer for transmitting a signal;

wherein at least two gaps are formed between the peak-valley structure of the second electrode layer and the third electrode layer, thereby providing parallel combinations of at least two different capacitances, and wherein the at least one second convex portions of the second electrode layer and the first electrode layer are connected to a power and a ground with the first via and the another first via, respectively.

12. The capacitor structure as claimed in claim 11 is used in a PCB.

13. The capacitor structure as claimed in claim 11, wherein the first dielectric layer is epoxy resin, polyimide, ABF (Ajinomoto build-up film), BT (Bismaleimide Triacine) or combinations thereof.

* * * * *